United States Patent
Dhanda et al.

(10) Patent No.: US 12,493,197 B2
(45) Date of Patent: Dec. 9, 2025

(54) CAMERA DEVICE ASSEMBLED WITH LENS-TO-SENSOR DISTANCE THAT REDUCES AUTO-FOCUSING ACTUATION POWER IN MACRO MODE

(71) Applicant: Meta Platforms Technologies, LLC, Menlo Park, CA (US)

(72) Inventors: Abhishek Dhanda, San Ramon, CA (US); Lidu Huang, Danville, CA (US); Yizhi Xiong, Foster City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 454 days.

(21) Appl. No.: 17/863,187

(22) Filed: Jul. 12, 2022

(65) Prior Publication Data
US 2023/0213780 A1 Jul. 6, 2023

Related U.S. Application Data

(63) Continuation-in-part of application No. 17/568,595, filed on Jan. 4, 2022, now abandoned.
(Continued)

(51) Int. Cl.
*G02B 27/62* (2006.01)
*G02B 7/02* (2021.01)
(Continued)

(52) U.S. Cl.
CPC ............ *G02B 27/62* (2013.01); *G02B 7/021* (2013.01); *G03B 30/00* (2021.01); *G04G 21/02* (2013.01)

(58) Field of Classification Search
CPC .......... G02B 27/62; G02B 7/021; G02B 7/08; G02B 15/22; G02B 7/105; G03B 30/00;
(Continued)

(56) References Cited

U.S. PATENT DOCUMENTS 7,656,460 B2   2/2010 Wernersson
8,350,959 B2   1/2013 Topliss et al.
(Continued)

FOREIGN PATENT DOCUMENTS

CN   104919390 A   9/2015
CN   105093482 A   11/2015
(Continued)

OTHER PUBLICATIONS

International Search Report and Written Opinion for International Application No. PCT/US2023/023216, mailed Sep. 11, 2023, 8 pages.
(Continued)

*Primary Examiner* — Thomas K Pham
*Assistant Examiner* — Jennifer A Jones
(74) *Attorney, Agent, or Firm* — Freestone Intellectual Property Law PLLC; Aaron J. Visbeek

(57) ABSTRACT

Embodiments of the present disclosure further relate to a camera device assembled such that to reduce (and in some cases minimize) auto-focusing actuation power when the camera device operates in a macro mode. The camera device includes an image sensor and a lens assembly in an optical series with the image sensor. During manufacturing of the camera device, the lens assembly is assembled within the camera device to have an optical axis substantially parallel to gravity and positioned to have an offset along the optical axis. The offset is determined during manufacturing of the camera device such that, when the camera device is in the macro mode, the lens assembly is positioned at a neutral position relative to the image sensor without actuation applied to the lens assembly.

14 Claims, 13 Drawing Sheets

Related U.S. Application Data

(60) Provisional application No. 63/308,429, filed on Feb. 9, 2022.

(51) Int. Cl.
  G03B 30/00 (2021.01)
  G04G 21/02 (2010.01)

(58) Field of Classification Search
  CPC .. G03B 2205/0007; G03B 5/00; G03B 13/36; G04G 21/02; G04G 17/06; G04G 17/04
  USPC .......................................................... 359/693
  See application file for complete search history.

(56) References Cited

U.S. PATENT DOCUMENTS

| | | | |
|---|---|---|---|
| 8,830,335 B2* | 9/2014 | Topliss | H04N 23/687 |
| | | | 359/554 |
| 9,134,503 B2 | 9/2015 | Topliss | |
| 10,362,303 B2 | 7/2019 | Kravitz et al. | |
| 10,621,729 B2 | 4/2020 | Sun et al. | |
| 10,805,556 B1 | 10/2020 | Sorgi et al. | |
| 2008/0031609 A1* | 2/2008 | Rukes | G03B 13/32 |
| | | | 396/89 |
| 2009/0295986 A1 | 12/2009 | Topliss et al. | |
| 2011/0273569 A1 | 11/2011 | Douady et al. | |
| 2013/0021685 A1 | 1/2013 | Fan et al. | |
| 2014/0009631 A1 | 1/2014 | Topliss | |
| 2014/0139637 A1* | 5/2014 | Mistry | H04N 23/51 |
| | | | 348/46 |
| 2014/0204245 A1 | 7/2014 | Wexler et al. | |
| 2015/0212336 A1* | 7/2015 | Hubert | H04N 23/55 |
| | | | 359/554 |
| 2015/0244904 A1 | 8/2015 | Bone et al. | |
| 2017/0003573 A1* | 1/2017 | Dayana | G03B 13/36 |
| 2018/0041689 A1* | 2/2018 | Cui | H04N 17/002 |
| 2019/0014258 A1 | 1/2019 | Horesh | |
| 2019/0141248 A1 | 5/2019 | Hubert et al. | |
| 2019/0297235 A1 | 9/2019 | Huang et al. | |
| 2020/0310227 A1 | 10/2020 | Hubert et al. | |
| 2021/0127059 A1 | 4/2021 | Powell et al. | |
| 2021/0231903 A1* | 7/2021 | Henriksen | G02B 7/02 |
| 2021/0396959 A1* | 12/2021 | Tseng | G02B 3/04 |
| 2022/0311914 A1* | 9/2022 | Park | H04N 23/57 |
| 2024/0231120 A1 | 7/2024 | Park | |

FOREIGN PATENT DOCUMENTS

| | | |
|---|---|---|
| CN | 107710735 A | 2/2018 |
| CN | 111756966 A | 10/2020 |
| CN | 112930678 A | 6/2021 |
| EP | 3828610 A1 | 6/2021 |

OTHER PUBLICATIONS

Non-Final Office Action mailed Mar. 29, 2024 for U.S. Appl. No. 17/719,272, filed Apr. 12, 2022, 19 pages.
Non-Final Office Action mailed Jan. 24, 2025 for U.S. Appl. No. 18/099,868, filed Jan. 20, 2023, 23 pages.
Non-Final Office Action mailed Sep. 9, 2024 for U.S. Appl. No. 17/568,595, filed Jan. 4, 2022, 23 pages.
International Preliminary Report on Patentability for International Application No. PCT/US2023/023216, mailed Dec. 5, 2024, 7 pages.
Final Office Action mailed Oct. 22, 2024 for U.S. Appl. No. 17/719,272, filed Apr. 12, 2022, 29 pages.
Final Office Action mailed Apr. 17, 2025 for U.S. Appl. No. 18/099,868, filed Jan. 20, 2023, 21 pages.
Office Action mailed Apr. 11, 2025 for Chinese Application No. 202310009276.5, filed Jan. 4, 2023, 11 pages.

* cited by examiner

700

---

Assemble, during assembling of a camera device, a lens assembly within the camera device to have an optical axis parallel to gravity
705

↓

Determine, during assembling of the camera device, an offset of the lens assembly along the optical axis relative to a support assembly such that, when the camera device is oriented with a rotated optical axis orthogonal to gravity, the lens assembly is positioned at a neutral position relative to an image sensor of the camera device without activation applied to the lens assembly
710

↓

Position, during assembling of the camera device, the lens assembly within the camera device to be in an optical series with the image sensor and to have the determined offset along the optical axis
715

```
┌─────────────────────────────────────────────────────────────────────┐
│ Assemble, during assembling of a camera device, a lens assembly     │
│ within the camera device to have an optical axis parallel to gravity│
│                             1005                                    │
└─────────────────────────────────────────────────────────────────────┘
                                  │
                                  ▼
┌─────────────────────────────────────────────────────────────────────┐
│ Determine, during assembling of the camera device, an offset of the │
│ lens assembly along the optical axis such that, when the camera     │
│ device is in a macro mode, the lens assembly is positioned at a     │
│ neutral position relative to an image sensor of the camera device   │
│ without activation applied to the lens assembly                     │
│                             1010                                    │
└─────────────────────────────────────────────────────────────────────┘
                                  │
                                  ▼
┌─────────────────────────────────────────────────────────────────────┐
│ Position, during assembling of the camera device, the lens assembly │
│ within the camera device to be in an optical series with the image  │
│ sensor and to have the determined offset along the optical axis     │
│                             1015                                    │
└─────────────────────────────────────────────────────────────────────┘
```

FIG. 10

CAMERA DEVICE ASSEMBLED WITH LENS-TO-SENSOR DISTANCE THAT REDUCES AUTO-FOCUSING ACTUATION POWER IN MACRO MODE

CROSS REFERENCE TO RELATED APPLICATIONS

This application is a continuation-in-part of U.S. patent application Ser. No. 17/568,595, filed Jan. 4, 2022, which is hereby incorporated by reference in its entirety. This application claims the benefit of U.S. Provisional Patent Application Ser. No. 63/308,429, filed Feb. 9, 2022, which is hereby incorporated by reference in its entirety.

FIELD OF THE INVENTION

The present disclosure relates generally to assembling of a camera device, and specifically relates to a camera device assembled with a specific lens-to-sensor distance that reduces an auto-focusing actuation power.

BACKGROUND

It is desired that for the most typical use case of a camera device, a lens in the camera device is at its near hyperfocal position relative to an image sensor so that a minimum (e.g., zero-level or near zero-level) auto-focusing actuation power is consumed for focusing of the lens. In the most typical use case of the camera device, the camera device is facing forward with its lens in horizontal posture in optical series with the image sensor. However, when the lens is in the horizontal posture, the lens is typically not at its hyperfocal position. There are two primary causes that affect a distance between the lens and the image sensor in the camera device, which then affect a level of auto-focusing actuation power consumed to bring the lens in its hyperfocal position. The first cause is movement of the lens (i.e., auto-focusing actuator movement) between an upward (vertical) posture of the lens and a forward (horizontal) posture of the lens. The lens is typically combined with a carrier, and, at the upward posture of the camera device, the carrier is shifted downward due to gravity. The second cause is a thermal shift of the lens during typical operations of the camera device. The lens design and its performance are commonly tested at a room temperature, e.g., around 23° C. However, the camera device can often operate at higher temperatures (e.g., around 45 to 50° C.) when placed inside an electronic wearable device (e.g., smartwatch). The higher temperatures of an interior of the electronic wearable device may cause additional shifting (i.e., thermal shifting) of the camera lens relative to the image sensor as well as a modified (e.g., longer) focal distance of the camera lens due to a change of the camera lens shape.

SUMMARY

Embodiments of the present disclosure relate to a camera device assembled such that to reduce (and in some cases minimize) auto-focusing actuation power for the most typical use case of the camera device. The camera device comprises an image sensor and a lens assembly in an optical series with the image sensor. During assembling of the camera device, the lens assembly is assembled within the camera device to have an optical axis parallel to gravity and positioned to have an offset along the optical axis relative to a support assembly. The offset is determined during assembling of the camera device such that, when the camera device is oriented with a rotated optical axis orthogonal to gravity, the lens assembly is positioned at a neutral position relative to the image sensor without actuation applied to the lens assembly. The camera device may be part of a wristband system, e.g., a smartwatch or some other electronic wearable device.

Embodiments of the present disclosure further relate to a method of assembling a camera device to reduce (and in some cases minimize) an auto-focusing actuation power for the most typical use case of the camera device. The method comprises: assembling a lens assembly within the camera device to have an optical axis parallel to gravity, determining an offset of the lens assembly along the optical axis relative to a support assembly such that, when the camera device is oriented with a rotated optical axis orthogonal to gravity, the lens assembly is positioned at a neutral position relative to the image sensor without actuation applied to the lens assembly, and positioning the lens assembly within the camera device to be in an optical series with an image sensor of the camera device and to have the determined offset along the optical axis.

Embodiments of the present disclosure further relate to a camera device assembled such that to reduce (and in some cases minimize) auto-focusing actuation power when the camera device operates in a macro mode (e.g., taking a close-up image of a local area). The camera device includes an image sensor and a lens assembly in an optical series with the image sensor. During manufacturing of the camera device, the lens assembly is assembled within the camera device to have an optical axis substantially parallel to gravity and positioned to have an offset along the optical axis. The offset is determined during manufacturing of the camera device such that, when the camera device is in the macro mode, the lens assembly is positioned at a neutral position relative to the image sensor without actuation applied to the lens assembly.

Embodiments of the present disclosure further relate to a method of manufacturing a camera device to reduce (and in some cases minimize) an auto-focusing actuation power when the camera device operates in a macro mode (e.g., taking a close-up image of a local area). The method comprises: assembling a lens assembly within the camera device to have an optical axis substantially parallel to gravity, determining an offset of the lens assembly along the optical axis such that, when the camera device is in the macro mode, the lens assembly is positioned at a neutral position relative to an image sensor of the camera device without actuation applied to the lens assembly, and positioning the lens assembly within the camera device to be in an optical series with the image sensor and to have the determined offset along the optical axis.

Embodiments of the present disclosure further relate to a wristband system. The wristband system comprises a watch band, a watch body that is removably coupled to the watch band, and a camera device located on the watch body. The camera device includes an image sensor and a lens assembly in an optical series with the image sensor. During manufacturing of the camera device, the lens assembly is assembled within the camera device to have an optical axis substantially parallel to gravity and positioned to have an offset along the optical axis, and the offset is determined such that, when the camera device is in a macro mode, the lens assembly is positioned at a neutral position relative to the image sensor without actuation applied to the lens assembly.

BRIEF DESCRIPTION OF THE DRAWINGS

FIG. 7 is a flowchart illustrating a process of assembling a camera device to have a specific distance between a lens assembly and an image sensor that reduces an auto-focusing actuation power, in accordance with one or more embodiments.

FIG. 10 is a flowchart illustrating a process of assembling a camera device to have a specific distance between a lens assembly and an image sensor when operating in a macro mode, in accordance with one or more embodiments.

Figures 1A, 1B:
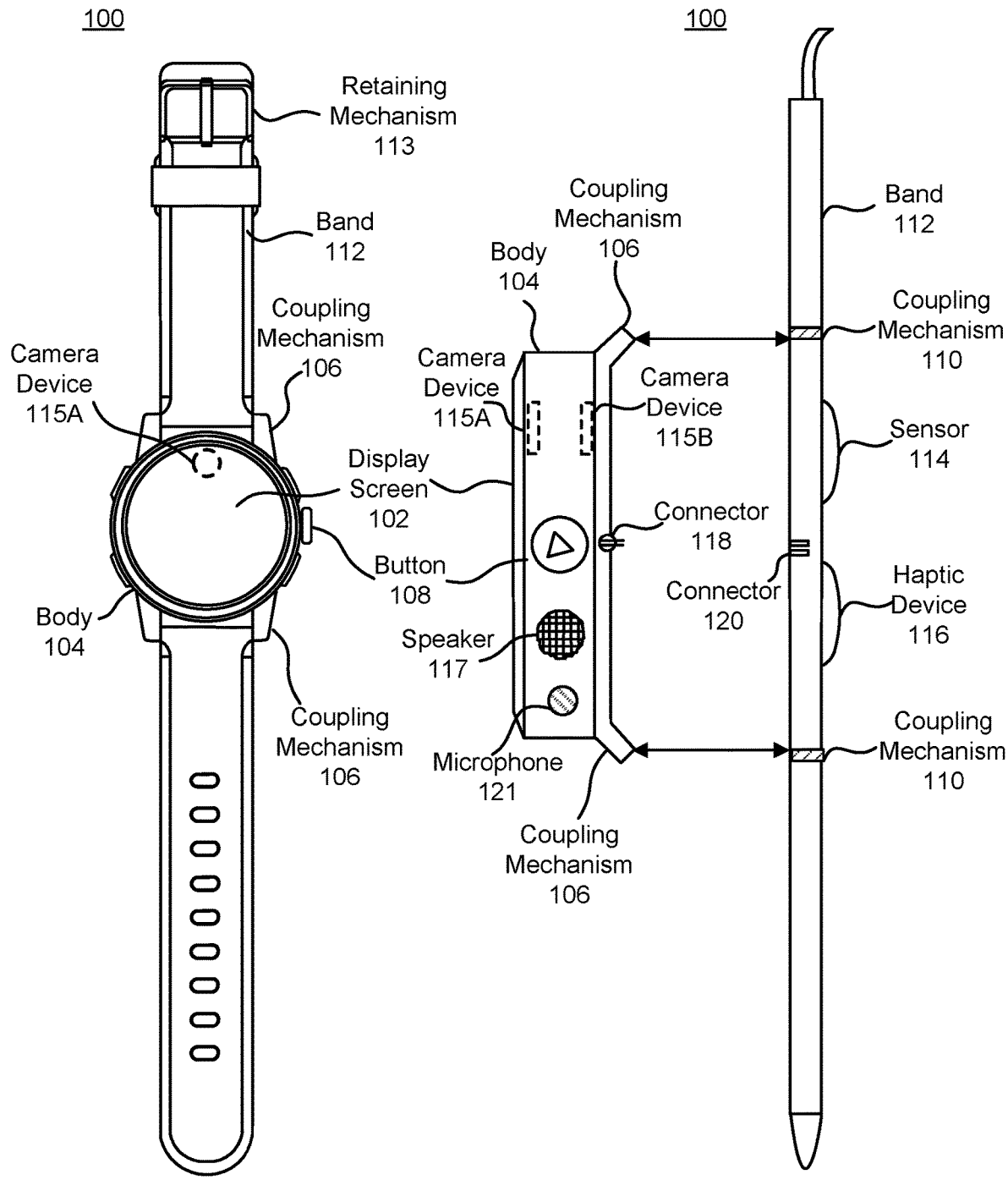
FIG. 1A is a top view of an example wristband system, in accordance with one or more embodiments.
FIG. 1B is a side view of the example wristband system of FIG. 1A.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the present disclosure relate to a camera device with a lens assembly assembled with a predetermined offset along an optical axis in an upward (or vertical) posture of the camera device such that the lens assembly with a small amount of actuation or no amount of actuation is at a target position in a forward (or horizontal) posture of the camera device where the lens assembly is focused at a hyperfocal distance. The camera device may be part of an electronic wearable device (e.g., a smartwatch). The camera device is assembled with the optical axis being substantially parallel to gravity (i.e., the lens is at the upward posture). During assembling of the camera device, the lens assembly is positioned (i.e., the offset is introduced) within the camera device, such that, during operation while the camera is poised (i.e., oriented with an optical axis orthogonal to gravity) to take an image of a local area, the lens assembly with a small amount of actuation or no amount of actuation is positioned at a neutral position. During assembling of the camera device, the lens assembly was positioned within the camera device such that the neutral position corresponds to the target position where the lens assembly is focused at the hyperfocal distance. Moreover, the positioning of the lens assembly during assembling of the camera device may also account for thermal effects of operation of the camera device, such that the target position is calibrated to occur over a specific temperature range.

Embodiments of the present disclosure further relate to a method for lens assembly position control for achieving a least actuation power consumption (e.g., zero-level actuation power) when (i) a camera device is in its most typical use posture (i.e., horizontal posture of the camera device and the lens assembly); and (ii) the camera device is operating at higher temperatures (e.g., around 45° C. to 50° C., which is a typical ambient condition for the camera device inside an electronic wearable device). For these two combined use cases, a reduced level (e.g., zero-level) of auto-focusing actuation force is applied to focus the lens assembly at a hyperfocal distance for the most typical use posture (i.e., horizontal or forward posture) of the camera device and the lens assembly.

Embodiments of the present disclosure further relate to a camera device with a lens assembly assembled to have a predetermined offset along an optical axis in a downward posture (or face down) of the camera device. In the downward posture, the lens assembly of the camera device is pointed towards the ground. In such case, the lens assembly is at a target position with a small amount of actuation or no amount of actuation applied to the lens assembly, where the lens assembly is focused at a "close-up distance" from a portion of a local area (e.g., one or more objects) being captured. The close-up distance can be defined as a distance (e.g., approximately 0.5 meter or less) substantially shorter than a hyperfocal distance (e.g., approximately 1.7 meter), and the camera device operates in a macro mode when lens assembly is focused at the close-up distance. The camera device operating in the macro mode may be part of a wristband system that encompasses an electronic wearable device (e.g., a smartwatch). The wristband system may include a watch band, a watch body that is removably coupled to the watch band, and the camera device located on the watch body.

Typically, when placed into the macro mode, a lens assembly and/or an image sensor in a camera device perform a relatively large movement in order to focus the lens assembly at the close-up distance. In small form factor camera devices with restrictive power budgets, placing the camera device in the macro mode can consume a substantial amount of this power budget. In contrast, a camera device presented herein is assembled such that the lens assembly is focused at the close-up distance (i.e., the camera device is placed in the macro mode) with only a small amount of auto-focusing actuation power or no auto-focusing actuation power being consumed.

The camera device may be assembled with the optical axis being substantially parallel to gravity (i.e., the lens is at the downward posture). During assembling of the camera device, the lens assembly may be positioned (i.e., the offset is introduced) within the camera device, such that, during the macro mode while the camera device is poised (i.e., oriented downward with the optical axis substantially parallel to gravity) to take a close-up image of the local area, the lens assembly with a small amount of actuation or no amount of actuation is positioned at a neutral position. During assembling of the camera device, the lens assembly was positioned within the camera device such that the neutral position corresponds to the target position where the lens assembly is focused at the close-up distance during the macro mode of the camera device. In some embodiments, the camera device may also operate in the macro mode at the forward (or horizontal or sideways) posture, where the lens assembly is at the target position and focused at the close-up distance with an amount of actuation less than a threshold amount. More details about operating the camera device in the macro mode are provided below in relation to FIGS. 8A-8B, FIG. 9 and FIG. 10.

The camera device may be incorporated into a small form factor electronic device, such as an electronic wearable device. Examples of electronic wearable devices include a smartwatch or a head-mount display (HMD). The electronic device can include other components (e.g., haptic devices, speakers, etc.). And, the small form factor of the electronic device provides limited space between the other components and the camera device. In some embodiments, the electronic device may have limited power supply (e.g., due to being dependent on a re-chargeable battery).

In some embodiments, the electronic wearable device may operate in an artificial reality environment (e.g., a virtual reality environment). The camera device of the electronic wearable device may be used to enhance an artificial reality application running on an artificial reality system (e.g., running on an HMD device worn by the user). The camera device may be disposed on multiple surfaces of the electronic wearable device such that data from a local area, e.g., surrounding a wrist of the user, may be captured in multiple directions. For example, one or more images may be captured describing the local area and the images may be sent and processed by the HMD device prior to be presented to the user.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including an electronic wearable device (e.g., headset) connected to a host computer system, a standalone electronic wearable device (e.g., headset, smartwatch, bracelet, etc.), a mobile device or computing system, or any other hardware platform capable of providing artificial reality content to one or more viewers.

FIG. 1A is a top view of an example wristband system 100, in accordance with one or more embodiments. FIG. 1B is a side view of the example wristband system 100 of FIG. 1A. The wristband system 100 is an electronic wearable device and may be worn on a wrist or an arm of a user. In some embodiments, the wristband system 100 is a smartwatch. Media content may be presented to the user wearing the wristband system 100 using a display screen 102 and/or one or more speakers 117. However, the wristband system 100 may also be used such that media content is presented to a user in a different manner (e.g., via touch utilizing a haptic device 116). Examples of media content presented by the wristband system 100 include one or more images, video, audio, or some combination thereof. The wristband system 100 may operate in an artificial reality environment (e.g., a VR environment, an AR environment, a MR environment, or some combination thereof).

In some examples, the wristband system 100 may include multiple electronic devices (not shown) including, without limitation, a smartphone, a server, a head-mounted display (HMD), a laptop computer, a desktop computer, a gaming system, Internet of things devices, etc. Such electronic devices may communicate with the wristband system 100 (e.g., via a personal area network). The wristband system 100 may have sufficient processing capabilities (e.g., central processing unit (CPU), memory, bandwidth, battery power, etc.) to offload computing tasks from each of the multiple electronic devices to the wristband system 100. Additionally, or alternatively, each of the multiple electronic devices may have sufficient processing capabilities (e.g., CPU, memory, bandwidth, battery power, etc.) to offload computing tasks from the wristband system 100 to the electronic device(s).

The wristband system 100 includes a watch body 104 coupled to a watch band 112 via one or more coupling mechanisms 106, 110. The watch body 104 may include, among other components, one or more coupling mechanisms 106, one or more camera devices 115 (e.g., camera device 115A and 115B), the display screen 102, a button 108, a connector 118, a speaker 117, and a microphone 121. The watch band 112 may include, among other components, one or more coupling mechanisms 110, a retaining mechanism 113, one or more sensors 114, the haptic device 116, and a connector 120. While FIGS. 1A and 1B illustrate the components of the wristband system 100 in example locations on the wristband system 100, the components may be located elsewhere on the wristband system 100, on a peripheral electronic device paired with the wristband system 100, or some combination thereof. Similarly, there may be more or fewer components on the wristband system 100 than what is shown in FIGS. 1A and 1B. For example, in some embodiments, the watch body 104 may include a port for connecting the wristband system 100 to a peripheral electronic device and/or to a power source. The port may enable charging of a battery of the wristband system 100 and/or communication between the wristband system 100 and a peripheral device. In another example, the watch body 104 may include an inertial measurement unit (IMU) that measures a change in position, an orientation, and/or an acceleration of the wristband system 100. The IMU may include one or more sensors, such as one or more accelerometers, one or more gyroscopes, one or more magnetometers, another suitable type of sensor that detects motion, a type of sensor used for error correction of the IMU, or some combination thereof.

The watch body 104 and the watch band 112 may have any size and/or shape that is configured to allow a user to wear the wristband system 100 on a body part (e.g., a wrist). The wristband system 100 may include the retaining mechanism 113 (e.g., a buckle) for securing the watch band 112 to the wrist of the user. The coupling mechanism 106 of the watch body 104 and the coupling mechanism 110 of the watch band 112 may attach the watch body 104 to the watch band 112. For example, the coupling mechanism 106 may couple with the coupling mechanism 110 by sticking to, attaching to, fastening to, affixing to, some other suitable means for coupling to, or some combination thereof.

The wristband system 100 may perform various functions associated with the user. The functions may be executed independently in the watch body 104, independently in the watch band 112, and/or in communication between the watch body 104 and the watch band 112. In some embodiments, a user may select a function by interacting with the button 108 (e.g., by pushing, turning, etc.). In some embodiments, a user may select a function by interacting with the display screen 102. For example, the display screen 102 is a touchscreen and the user may select a particular function by touching the display screen 102. The functions executed by the wristband system 100 may include, without limitation, displaying visual content to the user (e.g., displaying visual content on the display screen 102), presenting audio content to the user (e.g., presenting audio content via the speaker 117), sensing user input (e.g., sensing a touch of button 108, sensing biometric data with the one or more sensors 114, sensing neuromuscular signals with the one or more sensors 114, etc.), capturing audio content (e.g., capturing audio with microphone 121), capturing data describing a local area (e.g., with a front-facing camera device 115A and/or a rear-facing camera device 115B), communicating wirelessly (e.g., via cellular, near field, Wi-Fi, personal area network, etc.), communicating via wire (e.g., via the port), determining location (e.g., sensing position data with a sensor 114), determining a change in position (e.g., sensing change(s) in position with an IMU), determining an orientation and/or acceleration (e.g., sensing orientation and/or acceleration data with an IMU), providing haptic feedback (e.g., with the haptic device 116), etc.

The display screen 102 may display visual content to the user. The displayed visual content may be oriented to the eye gaze of the user such that the content is easily viewed by the user. Traditional displays on wristband systems may orient the visual content in a static manner such that when a user moves or rotates the wristband system, the content may remain in the same position relative to the wristband system causing difficulty for the user to view the content. The displayed visual content may be oriented (e.g., rotated, flipped, stretched, etc.) such that the displayed content remains in substantially the same orientation relative to the eye gaze of the user (e.g., the direction in which the user is looking). The displayed visual content may also be modified based on the eye gaze of the user. For example, in order to reduce the power consumption of the wristband system 100, the display screen 102 may dim the brightness of the displayed visual content, pause the displaying of visual content, or power down the display screen 102 when it is determined that the user is not looking at the display screen 102. In some examples, one or more sensors 114 of the wristband system 100 may determine an orientation of the display screen 102 relative to an eye gaze direction of the user.

The position, orientation, and/or motion of eyes of the user may be measured in a variety of ways, including through the use of optical-based eye-tracking techniques, infrared-based eye-tracking techniques, etc. For example, the front-facing camera device 115A and/or rear-facing camera device 115B may capture data (e.g., visible light, infrared light, etc.) of the local area surrounding the wristband system 100 including the eyes of the user. The captured data may be processed by a controller (not shown) internal to the wristband system 100, a controller external to and in communication with the wristband system 100 (e.g., a controller of an HMD), or a combination thereof to determine the eye gaze direction of the user. The display screen 102 may receive the determined eye gaze direction and orient the displayed content based on the eye gaze direction of the user.

In some embodiments, the watch body 104 may be communicatively coupled to an HMD. The front-facing camera device 115A and/or the rear-facing camera device 115B may capture data describing the local area, such as one or more wide-angle images of the local area surrounding the front-facing camera device 115A and/or the rear-facing camera device 115B. The wide-angle images may include hemispherical images (e.g., at least hemispherical, substantially spherical, etc.), 180-degree images, 360-degree area images, panoramic images, ultra-wide area images, or a combination thereof. In some examples, the front-facing camera device 115A and/or the rear-facing camera device 115B may be configured to capture images having a range between 45 degrees and 360 degrees. The captured data may be communicated to the HMD and displayed to the user on a display screen of the HMD worn by the user. In some examples, the captured data may be displayed to the user in conjunction with an artificial reality application. In some embodiments, images captured by the front-facing camera device 115A and/or the rear-facing camera device 115B may be processed before being displayed on the HMD. For example, certain features and/or objects (e.g., people, faces, devices, backgrounds, etc.) of the captured data may be subtracted, added, and/or enhanced before displaying on the HMD.

In accordance with embodiments of the present disclosure, components of the front-facing camera device 115A and the rear-facing camera device 115B may be capable of taking pictures capturing data describing the local area. A lens of the front-facing camera device 115A and/or a lens of the rear-facing camera device 115B can be automatically positioned at their target positions. A target position in a forward (or horizontal) posture of the front-facing camera device 115A may correspond to a position at which the lens of the front-facing camera device 115A is focused at a preferred focal distance (e.g., distance in the order of several decimeters). A target position in a forward (or horizontal) posture of the rear-facing camera device 115B may correspond to a position at which the lens of the rear-facing camera device 115B is focused at a hyperfocal distance in the local area (e.g., a distance of approximately 1.7 meter). An upward (vertical) posture of the front-facing camera device 115A (or the rear-facing camera device 115B) corresponds to a posture where an optical axis is substantially parallel to gravity. And a forward (horizontal) posture of the front-facing camera device 115A (or the rear-facing camera device 115B) corresponds to a posture when the optical axis is substantially orthogonal to gravity.

In some embodiments, the front-facing camera device 115A and/or the rear-facing camera device 115B are assembled such that front-facing camera device 115A and/or the rear-facing camera device 115B can be placed in the macro mode with only a small amount of auto-focusing actuation power or no auto-focusing actuation power being consumed. During assembling of the front-facing camera device 115A and/or the rear-facing camera device 115B, the lens of the front-facing camera device 115A and/or the lens of the rear-facing camera device 115B may be positioned (i.e., an offset is introduced), such that, during the macro mode while the front-facing camera device 115A and/or the rear-facing camera device 115B are poised (i.e., oriented downward with an optical axis substantially parallel to gravity) to take a close-up image of the local area, the lens is positioned at a neutral position with a small amount of actuation or no amount of actuation applied to the lens.

Figure 2A:
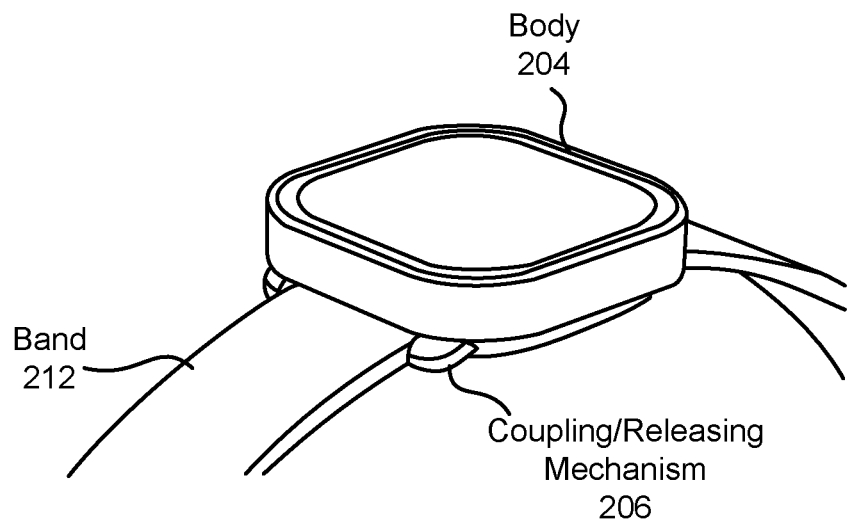
FIG. 2A is a perspective view of another example wristband system, in accordance with one or more embodiments.

FIG. 2A is a perspective view of another example wristband system 200, in accordance with one or more embodiments. The wristband system 200 includes many of the same components described above with reference to FIGS. 1A and 1B, but a design or layout of the components may be modified to integrate with a different form factor. For example, the wristband system 200 includes a watch body 204 and a watch band 212 of different shapes and with different layouts of components compared to the watch body 104 and the watch band 112 of the wristband system 100. FIG. 2A further illustrates a coupling/releasing mechanism 206 for coupling/releasing the watch body 204 to/from the watch band 212.

Figure 2B:
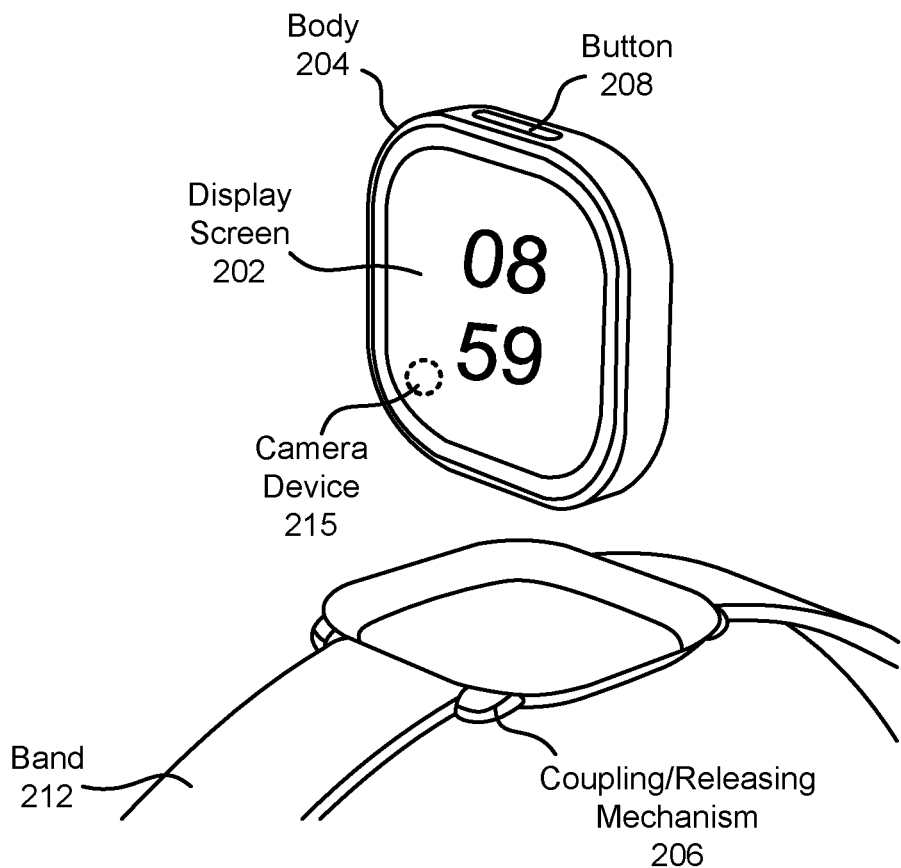
FIG. 2B is a perspective view of the example wristband system of FIG. 2A with a watch body released from a watch band, in accordance with one or more embodiments.

FIG. 2B is a perspective view of the example wristband system 200 with the watch body 204 released from the watch band 212, in accordance with one or more embodiments. FIG. 2B further illustrates a camera device 215A, a display screen 202, and a button 208. In some embodiments, another camera device may be located on an underside of the watch body 204 and is not shown in FIG. 2B. In some embodiments (not shown in FIGS. 2A-2B), one or more sensors, a speaker, a microphone, a haptic device, a retaining mechanism, etc. may be included on the watch body 204 or the watch band 212. As the wristband system 100 and the wristband system 200 are of a small form factor to be easily and comfortably worn on a wrist of a user, the corresponding camera devices 115, 215 and various other components of the wristband system 100 and the wristband system 200 described above are designed to be of an even smaller form factor and are positioned close to each other.

In some embodiments, the camera device 215 is assembled such the camera device 215 can be placed in the macro mode with only a small amount of auto-focusing actuation power or no auto-focusing actuation power being consumed. During assembling of the camera device 215, a lens assembly of the camera device 215 may be positioned (i.e., an offset is introduced) within the camera device 215, such that, during the macro mode while the camera device 215 is poised (i.e., oriented downward with an optical axis substantially parallel to gravity) to take a close-up image of the local area, the lens assembly of the camera device 215 is positioned at a neutral position with a small amount of actuation or no amount of actuation applied to an actuator of the lens assembly.

Figure 3:
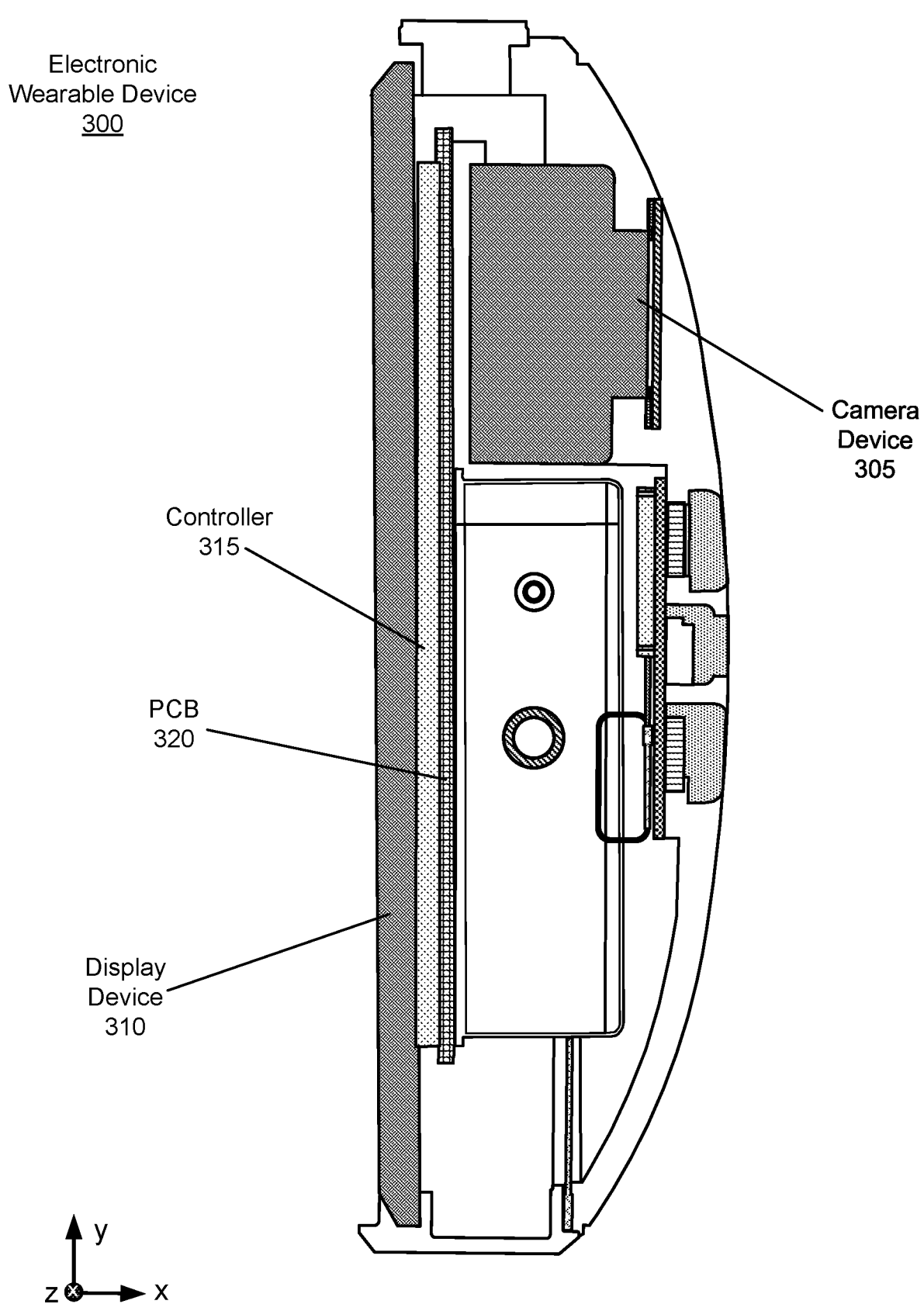
FIG. 3 is a cross section of an electronic wearable device, in accordance with one or more embodiments.

FIG. 3 is a cross section of an electronic wearable device 300, in accordance with one or more embodiments. The electronic wearable device 300 may be worn on a wrist or an arm of a user. In some embodiments, the electronic wearable device 300 is a smartwatch. The electronic wearable device 300 may be an embodiment of the wristband system 100 or the wristband system 200. The electronic wearable device 300 is shown in FIG. 3 in the forward (horizontal) posture. The electronic wearable device 300 includes a camera device 305, a display device 310, a controller 315, and a printed circuit board (PCB) 320. There may be more or fewer components of the electronic wearable device 300 than what is shown in FIG. 3.

The camera device 305 may capture data (e.g., one or more images) of a local area surrounding the electronic wearable device 300. The camera device 305 may be an embodiment of the camera devices 115, 215. Details about a structure and operation of the camera device 305 are provided below in relation to FIG. 4.

The display device 310 may display visual content to the user on a display screen of the display device 310. Additionally, the display device 310 may present audio content to the user, sense user input, capture audio content, capturing data describing a local area (e.g., with the camera device 305), communicate wirelessly, communicate via wire, determine location, determine a change in position, determining an orientation and/or acceleration, providing haptic feedback, and/or provide some other function. The display screen of the display device 310 may be an embodiment of the display screen 102 or the display screen 202.

The controller 315 may control operations of the camera device 305, the display device 310 and/or some other component(s) of the electronic wearable device 300. The controller 315 may control OIS, autofocusing, actuation, some other operation applied at the camera device 305, or some combination thereof. The controller 315 may also process data captured by the camera device 305. Furthermore, the controller 315 may control any aforementioned functions of the display device 310. In some embodiments, the controller 315 is part of the camera device 305.

The PCB 320 is a stationary component of the electronic wearable device 300 and provides mechanical support (e.g., by acting as a base) for the electronic wearable device 300. The PCB 320 may provide electrical connections for the camera device 305, the display device 310 and the controller 315. The PCB 320 may also electrically connect the controller 315 to the camera device 305 and the display device 310.

In some embodiments, the camera device 305 is assembled such the camera device 305 can be placed in the macro mode with only a small amount of auto-focusing actuation power or no auto-focusing actuation power being consumed. During assembling of the camera device 305, a lens assembly of the camera device 305 may be positioned (i.e., an offset is introduced) within the camera device 305, such that, during the macro mode while the camera device 305 is poised (i.e., oriented downward with an optical axis substantially parallel to gravity) to take a close-up image of the local area, the lens assembly of the camera device 305 is positioned at a neutral position with a small amount of actuation or no amount of actuation applied to an actuator of the lens assembly.

Figure 4:
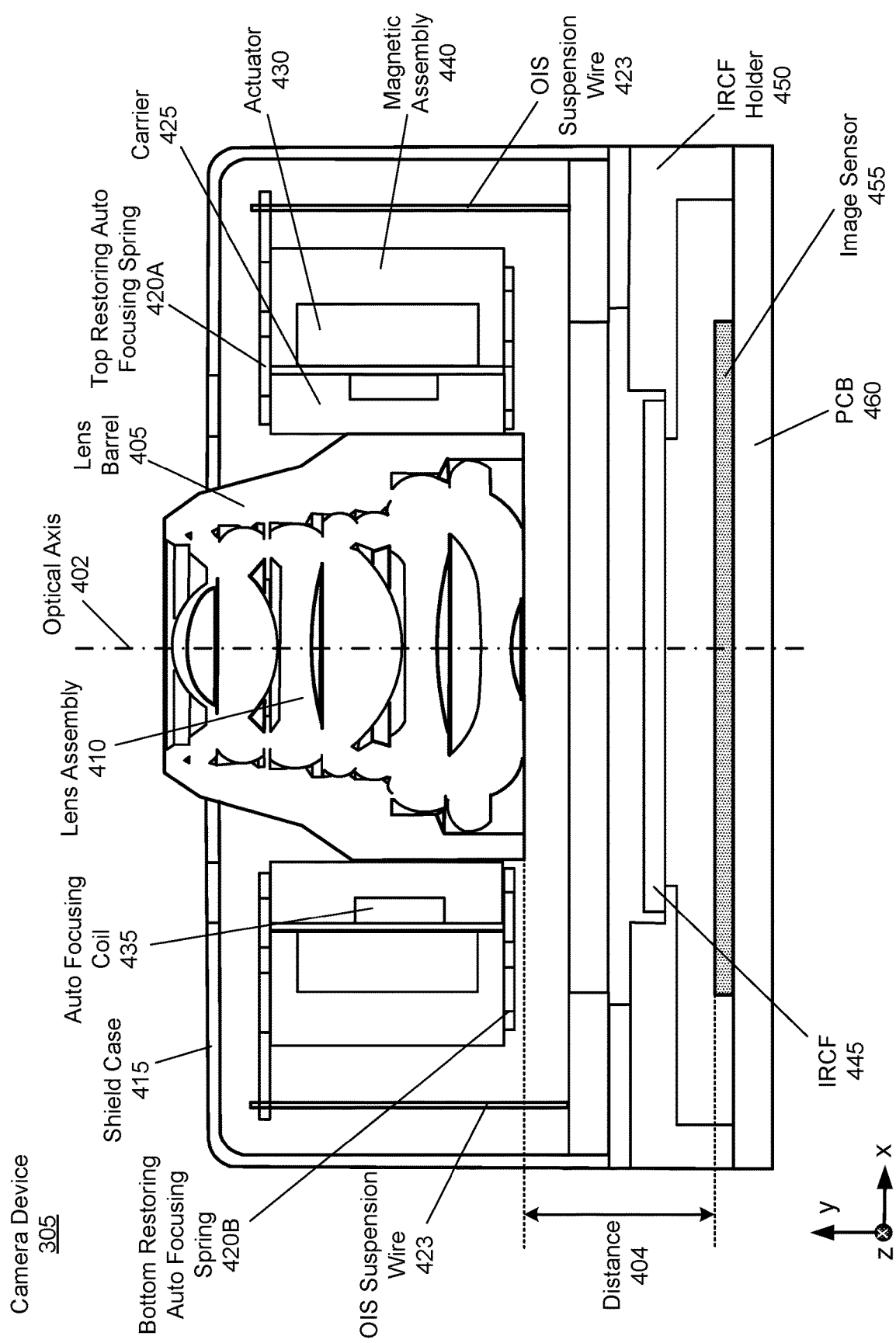
FIG. 4 is a cross section of an example structure of a camera device, in accordance with one or more embodiments.

FIG. 4 is a cross section of an example structure of the camera device 305, in accordance with one or more embodiments. The camera device 305 includes a lens barrel 405, a lens assembly 410, a shield case 415, one or more top restoring auto focusing springs 420A, one or more bottom restoring auto focusing springs 420B, one or more optical image stabilization (OIS) suspension wires 423, a carrier 425, one or more actuators 430, one or more auto focusing coils 435, a magnetic assembly 440, an infrared cut-off filter (IRCF) 445, an IRCF holder 450, an image sensor 455, and a printed circuit board (PCB) 460. The one or more top restoring auto focusing springs 420A together with the one or more bottom restoring auto focusing springs 420B are collectively referred to herein as "one or more restoring auto focusing springs 420." In alternative configurations, different and/or additional components may be included in the camera device 305. For example, in some embodiments, the camera device 305 may include a controller (not shown in FIG. 4). In alternative embodiments, the controller may be part of some other system (e.g., the electronic wearable device 300 the camera device 305 is integrated into).

The camera device 305 is configured to have both a focusing assembly and a stabilization assembly. The focusing assembly is configured to cause a translation of the lens barrel 405 in a direction parallel to an optical axis 402 of the lens assembly 410. The focusing assembly provides an auto focus functionality for the camera device 305. The focusing assembly includes the one or more restoring auto focusing springs 420, the one or more OIS suspension wires 423, and a plurality of magnets included in the magnetic assembly 440. The stabilization assembly is configured to cause a translation of the lens barrel 405 (and, in some embodiments, the magnetic assembly 440 and the lens barrel 405) in one or more directions perpendicular to the optical axis 402. The stabilization assembly provides an OIS functionality for the camera device 305 by stabilizing an image projected through the lens barrel 405 to the image sensor 455. The stabilization assembly includes the lens barrel 405, the shield case 415, and the magnetic assembly 440.

The lens barrel 405 is a mechanical structure or housing for carrying one or more lenses of the lens assembly 410. The lens barrel 405 is a hollow structure with an opening on opposite ends of the lens barrel 405. The openings may provide a path for light (e.g., visible light, infrared light, etc.) to transmit between a local area and the image sensor 455. Inside the lens barrel 405, one or more lenses of the lens assembly 410 are positioned between the two openings. The lens barrel 405 may be manufactured from a wide variety of materials ranging from plastic to metals. In some embodiments, one or more exterior surfaces of the lens barrel 405 are coated with a polymer (e.g., a sub-micron thick polymer). The lens barrel 405 may be rotationally symmetric about the optical axis 402 of the one or more lenses of the lens assembly 410.

The lens barrel 405 may be coupled to the magnetic assembly 440 by the one or more restoring auto focusing springs 420. For example, the one or more restoring auto focusing springs 420 are coupled to the lens barrel 405 and the magnetic assembly 440. In some embodiments, the magnetic assembly 440 is coupled to the shield case 415. In another example (not illustrated), the one or more restoring auto focusing springs 420 are coupled to the shield case 415 directly and the lens barrel 405. The one or more restoring auto focusing springs 420 are configured to control a positioning of the lens barrel 405 along the optical axis 402. For example, the plurality of restoring auto focusing springs 420 may control the positioning of the lens barrel 405 such that when current is not supplied to the one or more auto focusing coils 435 the lens barrel 405 is in a neutral position. In some embodiments, the one or more restoring auto focusing springs 420 may be shape-memory alloy (SMA) wires. The neutral position of the lens barrel 405 is a positioning of the lens barrel 405 when the camera device 305 is not undergoing focusing (via the focusing assembly) nor stabilizing (via the stabilization assembly). The one or more restoring auto focusing springs 420 can ensure the lens barrel 405 does not fall out or come into contact with the image sensor 455. In some embodiments, the one or more restoring auto focusing springs 420 are conductors and may be coupled to the one or more auto focusing coils 435. In these embodiments, the plurality of restoring auto focusing springs 420 may be used to provide current to the one or more auto focusing coils 435. The one or more restoring auto focusing springs 420 may be coupled to the one or more OIS suspension wires 423 that provide current to the one or more restoring auto focusing springs 420 so that the one or more restoring auto focusing springs 420 can facilitate auto focusing of the lens assembly 410. The one or more OIS suspension wires 423 may be positioned symmetrically about the optical axis 402.

The shield case 415 may enclose some of the components of the camera device 305 as illustrated in FIG. 4. In other embodiments (not shown), the shield case 415 may encloses all of the components of the camera device 305. As illustrated in FIG. 4, the shield case 415 partially encloses the lens barrel 405. The shield case 415 provides a space in which the lens barrel 405 can translate along the optical axis 402 and/or translate in a direction perpendicular to the optical axis 402. In some embodiments, the shield case 415 provides a space in which the lens barrel 405 rotates relative to one or more axes that are perpendicular to the optical axis 402. In some embodiments, the shield case 415 may be rectangular-shaped as illustrated. In alternative embodiments, the shield case 415 may be circular, square, hexagonal, or any other shape. In embodiments where the camera device 305 is part of another electronic device (e.g., a smartwatch), the shield case 415 may couple to (e.g., be mounted on, affixed to, attached to, etc.) another component of the electronic device, such as a frame of the electronic device. For example, the shield case 415 may be mounted on a watch body (e.g., the watch body 104) of the smartwatch. The shield case 415 may be manufactured from a wide variety of materials ranging from plastic to metals. In some examples, the shield case 415 is manufactured from a same material as the material of the electronic device the shield case 415 is coupled to such that the shield case 415 is not distinguishable from the rest of the electronic device. In some embodiments, the shield case 415 is manufactured from a material that provides a magnetic shield to surrounding components of the electronic device. In these embodiments, the shield case 415 may be a shield can. In some embodiments, one or more interior surfaces of the shield case 415 are coated with a polymer similar to the lens barrel 405 described above.

The carrier 425 is directly coupled to the lens barrel 405. For example, the carrier 425 comprises a first side in direct contact with a surface of the lens barrel 405 and a second side opposite the first side. In some embodiments, the carrier 425 is coupled to the lens barrel 405 by an adhesive. The one or more auto focusing coils 435 may be affixed to the second side of the carrier 425. The carrier 425 has a curvature that conforms to the curvature of the lens barrel 405. In some embodiments, more than one carrier 425 may be directly coupled to the lens barrel 405. In these embodiments, the number of carriers 425 may match a number of auto focusing coils 435 and the carriers 425 may be positioned at unique locations around the lens barrel 405 such that a carrier 425 is positioned between a corresponding auto focusing coil 435 and the lens barrel 405. In some embodiments, the restoring auto focusing springs 420 may be coupled to the carrier 425.

The one or more auto focusing coils 435 are configured to conduct electricity by being supplied with a current. The one or more auto focusing coils 435 may be positioned symmetrically about the optical axis 402. For example, the one or more auto focusing coils 435 may consist of two individual coils positioned symmetrically about the optical axis 402, as illustrated in FIG. 4. The one or more auto focusing coils 435 are coupled to the one or more actuators 430 and provide the current to the one or more actuators 430.

The one or more actuators 430 are configured to provide auto focusing to the one or more lenses of the lens assembly 410. The one or more actuators 430 consume an auto focusing actuation power while providing auto focusing to the one or more lenses of the lens assembly 410. To reduce (and in some cases minimize) a level of the auto focusing actuation power consumption (e.g., to achieve the zero level auto focusing actuation power), relative positions of the lens assembly, the carrier 425 and the one or more actuators 430 along the optical axis 402 are controlled during assembling of the camera device 305. During assembling of the camera device 305, the relative positions of the lens assembly 410, the carrier 425 and the one or more actuators 430 along the optical axis 402 may be controlled by using a lens spacer (not shown in FIG. 4). The lens spacer may be configured to hold the one or more lenses of the lens assembly 410 in place when the lens assembly 410 and the lens barrel 405 are ready to be bonded to the carrier 425 during assembling of the camera device 305.

A relative position of the lens assembly 410 along the optical axis 402 may be determined during assembling of the camera device 305 by following variables. The first variable may be related to an effective back focal length (BFL) of the lens assembly 410. The effective BFL of the lens assembly 410 may depend on a distance from each lens in the lens assembly 410 to the image sensor 455. The effective BFL of the lens assembly 410 can be defined by design of each individual lens in the lens assembly 410. The second variable may be related to a displacement of the carrier 425 under gravity at the upright posture of the camera device 305, i.e., the posture of the camera device 305 as illustrated in FIG. 4. The carrier 425 moves downward under gravity during assembling of the camera device 305 with the actuator 430 being at an upward (or vertical) posture. The displacement of the carrier 425 under gravity may be determined by a weight of the carrier 425 and a stiffness of the one or more restoring auto focusing springs 420. The third variable may be related to a springback displacement of the lens assembly 410 and the carrier 425 at the most typical use posture of the camera device 305 (i.e., the forward or horizontal posture as shown in FIG. 5D) when the one or more lenses of the lens assembly 410 are in the forward (horizontal) posture. In such case, the lens assembly 410 moves away from the image sensor 455 due to an actuator spring force. The springback displacement may be determined by a weight of the actuator 430, and a spring constant of the one or more restoring auto focusing springs 420. The fourth variable may be related to a thermal shift of the one or more lenses of the lens assembly 410 at an expected operating temperature of the camera device 305. The expected operating temperature of the camera device 305 is typically elevated when the camera device 305 operates inside an electronic wearable device (e.g., a smartwatch). The fifth variable may be related to a modified (e.g., longer) focal distance of the one or more lenses of the lens assembly 410 due to a change of shape(s) of the one or more lenses caused by the elevated operating temperature of the camera device 305.

There are two primary causes affecting actuation power consumption in order to bring the lens assembly 410 at a hyperfocal position within the camera device 305 when the camera device 305 is at its forward (horizontal) posture: (i) a movement of the camera device 305 from an upward (vertical) posture to a forward (horizontal) posture; and (ii) a thermal shift of the one or more lenses of the lens assembly 410 at an expected operating temperature of the camera device 305 within an electronic wearable device. The upward (vertical) posture of the camera device 305 corresponds to a posture of the camera device 305 where the optical axis 402 is substantially parallel to gravity (e.g., parallel to y axis in FIG. 4). The forward (horizontal) posture of the camera device 305 corresponds to a posture of the camera device 305 with a rotated optical axis substantially perpendicular to the optical axis 402 (i.e., parallel to x axis in FIG. 4). The hyperfocal position of the lens assembly 410 corresponds to a position of the lens assembly 410 within the camera device 305 at which the lens assembly 410 is focused at a hyperfocal distance within a local area (e.g., 1.7 meter) when the camera device 305 is at the forward posture.

Embodiments of the present disclosure relate to assembling the camera device 305 in order to achieve a specific distance 404 between the lens assembly 410 and the image sensor 455 along the optical axis 402, when the camera device 305 is at the upward posture. By setting the distance 404 during assembling of the camera device 305, the lens assembly 410 is at the hyperfocal position while consuming an auto focusing actuation power below a defined threshold level when the camera device 305 is at the forward posture. In some embodiments, when the camera device 305 is at the forward posture, the lens assembly 410 is automatically at the hyperfocal position without consuming any auto focusing actuation power. The distance 404 between the lens assembly 410 and the image sensor 455 can be defined as a distance along the optical axis 402 between a surface of the image sensor 455 oriented toward the lens assembly 410 and a surface of a lens in the lens assembly 410 nearest to the surface of the image sensor 455. The specific value of the distance 404 can be determined during assembling of the camera device 305 by considering: (i) a posture difference of the actuator 430 with and without the lens assembly 410; and (ii) a thermal shift the one or more lenses of the lens assembly 410 assuming a typical system interior temperature near the camera device 305 in the range of approximately, e.g., 40° C. to 50° C.

The magnetic assembly 440 includes a magnet holder for holding a plurality of magnets. The magnet holder may provide a rigid structure to support the plurality of magnets. In some embodiments, the magnet holder may enclose all sides of the magnets. In other embodiments, the magnet holder may enclose all sides of the magnets except for a side facing the one or more auto focusing coils 435. In some embodiments, one or more exterior surfaces of the magnetic assembly 440 are coated with a polymer similar to the lens barrel 405 described above.

The plurality of magnets of the magnetic assembly 440 generate magnetic fields that can be used for translating the lens barrel 405 along the optical axis 402 (e.g., focusing the camera device 305) and/or perpendicular to the optical axis 402 (e.g., providing OIS for the camera device 305). The magnetic fields used for focusing the camera device 305 can be applied in the forward (horizontal) posture of the camera device 305, e.g., to focus the lens assembly 410 at the hyperfocal distance without consuming any auto focusing actuation power.

Each magnet of the plurality of magnets may be a different size or the same size. In some embodiments, each magnet is curved about the optical axis 402 conforming to the curvature of the one or more auto focusing coils 435 and the lens barrel 405. In some embodiments, each magnet is straight. For example, at least two opposing sides of each magnet are parallel to a plane that is parallel to the optical axis 402. Each magnet of the plurality of magnets may include rectangular cross sections with one axis of a cross section being parallel to the optical axis 402 and another axis of the cross section being perpendicular to the optical axis 402. In some embodiments, each magnet may include other types of cross sectional shapes such as square or any other shape that includes at least one straight-edged side that faces the one or more auto focusing coils 435. Each magnet is a permanent magnet that is radially magnetized with respect to the optical axis 402. The magnets may be positioned symmetrically about the optical axis 402.

The image sensor 455 captures data (e.g., one or more images) describing a local area. The image sensor 455 may include one or more individual sensors, e.g., a photodetector, a CMOS sensor, a CCD sensor, some other device for detecting light, or some combination thereof. The individual sensors may be in an array. For a camera device 305 integrated into an electronic device, the local area is an area surrounding the electronic device. The image sensor 455 captures light from the local area. The image sensor 455 may capture visible light and/or infrared light from the local area surrounding the electronic device. The visible and/or infrared light is focused from the local area to the image sensor 455 via the lens barrel 405. The image sensor 455 may include various filters, such as the IRCF 445. The IRCF 445 is a filter configured to block the infrared light from the local area and propagate the visible light to the image sensor 455. The IRCF 445 may be placed within the IRCF holder 450.

The PCB 460 is positioned below the image sensor 455 along the optical axis 402. The PCB 460 is a stationary component of the camera device 305 and provides mechanical support (e.g., by acting as a base) for the camera device 305. The PCB 460 may provide electrical connections for one or more components of the camera device 305. The PCB 460 may be an embodiment of the PCB 320. In some embodiments, a controller may be located on the PCB 460 and the PCB 460 electrically connects the controller to various components (e.g., the one or more auto focusing coils 435) of the camera device 305. In other embodiments (not shown), the controller may be located in a different location within the camera device 305 or external to the camera device 305.

Figure 5A:
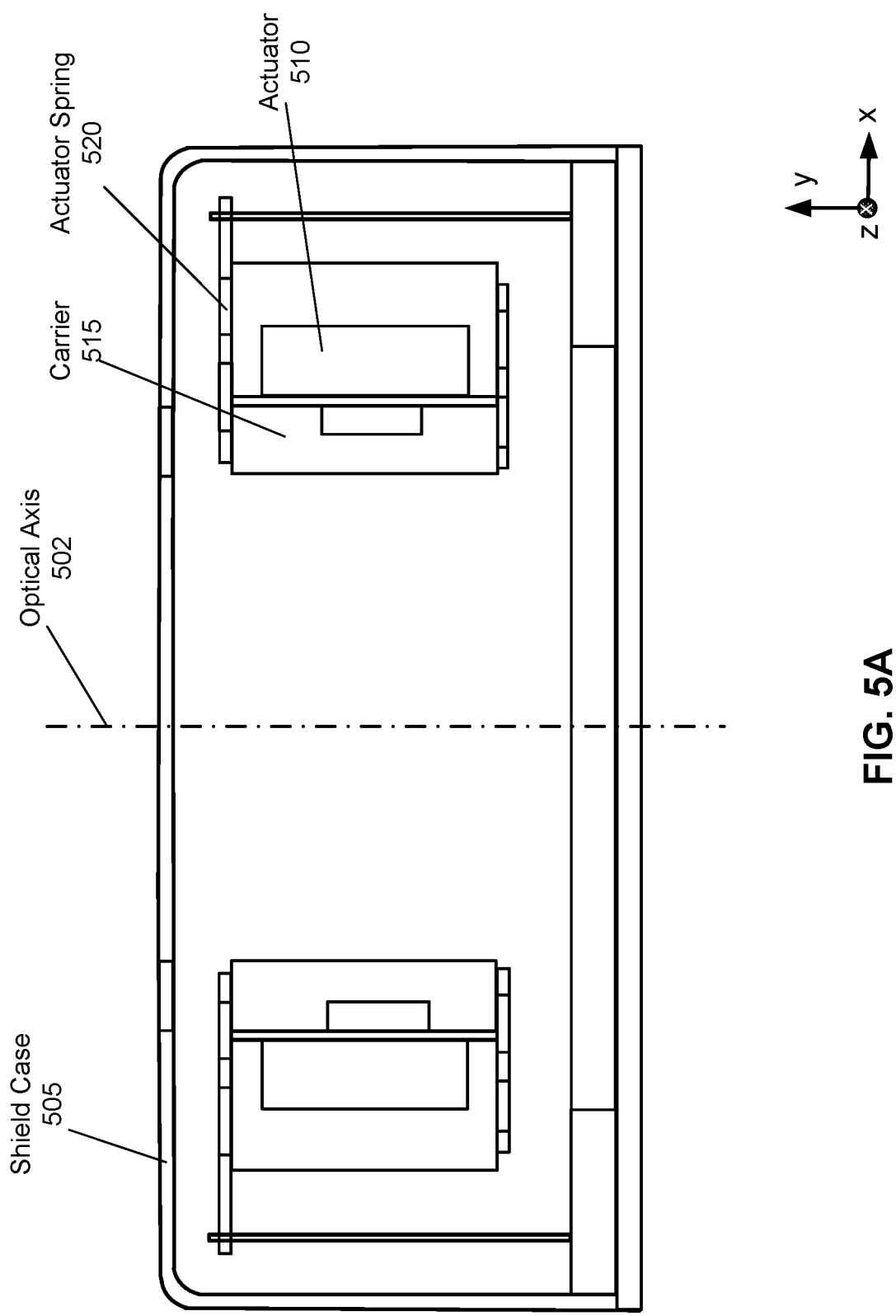
FIG. 5A is a cross section of an example shield case of a camera device during assembling of the camera device, in accordance with one or more embodiments.

FIG. 5A is a cross section 500 of an example shield case 505 of a camera device during assembling of the camera device, in accordance with one or more embodiments. The shield case 505 may be an embodiment of the shield case 415 of the camera device 305 in FIG. 4. The shield case 505 in FIG. 5A is illustrated for the step of assembling the camera device prior to positioning of a lens barrel and a lens assembly within the camera device. As shown in FIG. 5A, an actuator 510 is in the upward (vertical) posture and ready for module assembly, i.e., assembling of a lens barrel (i.e., an embodiment of the lens barrel 510) and a lens assembly (i.e., an embodiment of the lens assembly 405). Note that a carrier 515 may be at a lower relative position along an optical axis 502 due to gravity. A displacement of the carrier 515 due to gravity may be determined by one or more features (e.g., a stiffness) of an actuator spring 520. The actuator 510, the carrier 515 and the actuator spring 520 may be embodiments of the actuator 430, the carrier 425, and the restoring auto focusing spring 420, respectively.

Figure 5B:
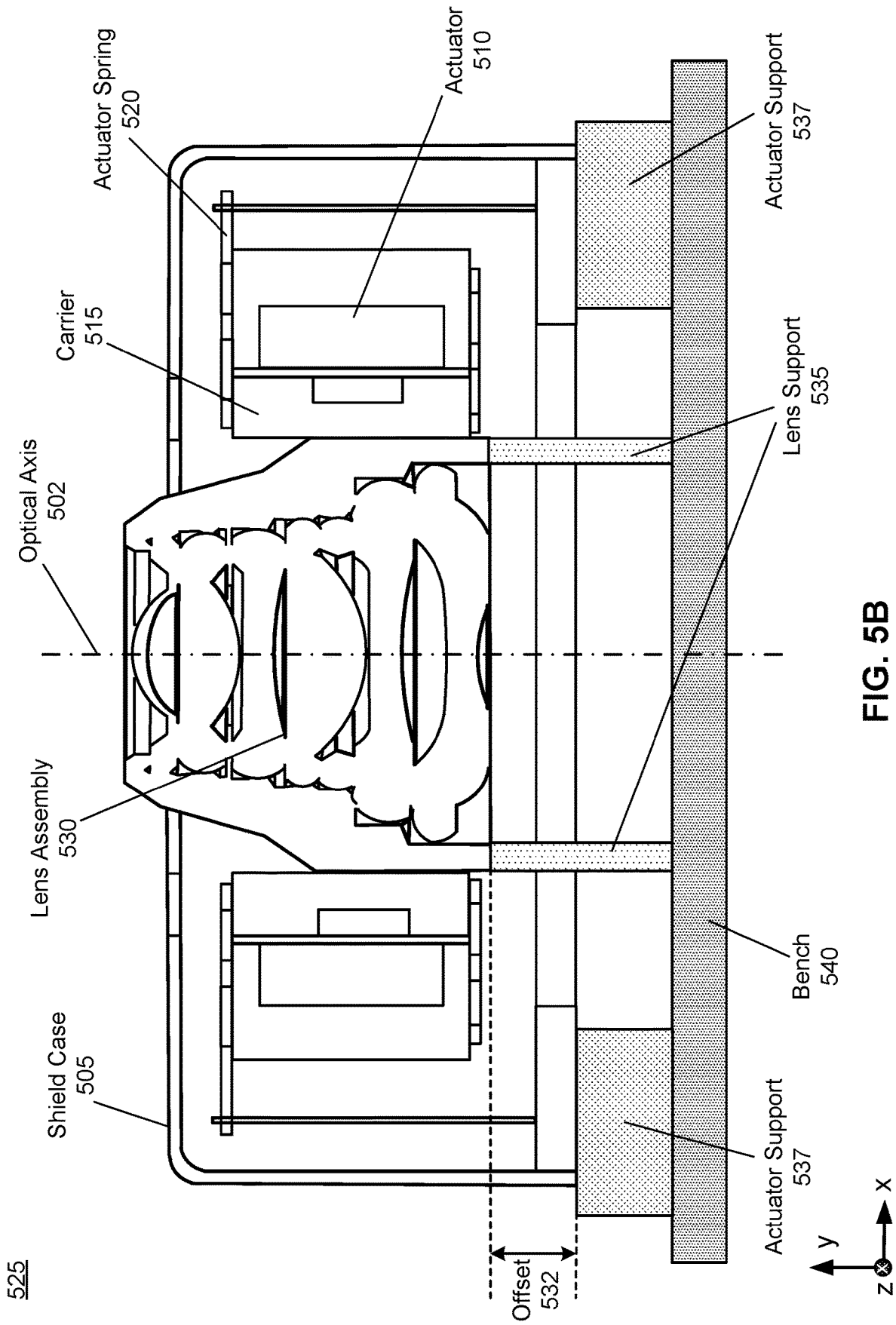
FIG. 5B is an example cross section of the camera device with a lens assembly during assembling of the camera device, in accordance with one or more embodiments.

FIG. 5B is an example cross section 525 of the camera device with a lens assembly 530 during assembling of the camera device, in accordance with one or more embodiments. The lens assembly 530 may be an embodiment of the lens assembly 405. A specific height (e.g., an offset 532) of the lens assembly 530 along the optical axis 502 may be achieved during assembling of the camera device by using a support assembly. The support assembly may be configured as an assembly that supports the lens assembly 530, e.g., to hold one or more lenses of the lens assembly 530 in position for, e.g., glue bonding during assembling of the camera device. In one or more embodiments, the support assembly includes a lens support 535 and an actuator support 537 placed on top of a bench 540. Alternatively, the support assembly may include one or more additional or different components not shown in FIG. 5B. A cross section of the lens support 535 (not shown in FIG. 5B) may be cylindrically shaped (e.g., ring shaped), and a cross section of the actuator support 537 (not shown in FIG. 5B) may be rectangularly shaped.

The offset 532 may be defined as a distance between an inner surface of the actuator support 537 coupled to the shield case 505 and a surface of a lens in the lens assembly 530 closest to the inner surface of the actuator support 537. The amount of offset 532 may be controlled during assembling of the camera device based on specific heights of the lens support 535 and the actuator support 537 along the optical axis 502. The achieved offset 532 of the lens assembly 530 would reduce (and in some cases minimize) an auto-focusing actuation power for the most typical use case of the camera device, i.e., for forward (horizontal) posture of the camera device. In some embodiments, the offset 532 of the lens assembly 530 along the optical axis 502 is determined so that no auto-focusing actuation power is applied to focus the lens assembly 530 at the hyperfocal distance when the camera device is at the forward posture. In other words, by determining one or more specific heights of one or more components of the support assembly (e.g., the lens support 535 and the actuator support 537) along the optical axis 502 and setting the offset 532, the lens assembly 530 may be automatically in its hyperfocal position without applying any auto-focusing actuation power. The auto-focusing actuation power can be defined as a power consumed by the actuator 510 and the actuator spring 520 for moving the one or more lenses of the lens assembly 530 in order to bring the lens assembly 530 at the hyperfocal position within the camera device when the lens assembly 530 is in the horizontal (forward) posture having a rotated optical axis perpendicular to the optical axis 502 (i.e., perpendicular to gravity).

The offset 532 of the lens assembly 530 relative to the support assembly introduced during assembling of the camera device may provide that the lens assembly 530 would be at the hyperfocal position within the camera device while consuming an auto-focusing actuation power below a defined threshold level when the camera device and the lens assembly 530 are moved from the vertical (upward) posture to the horizontal (forward) posture. In some embodiments, the introduced offset 532 ensures that the lens assembly 530 is already at the hyperfocal position within the camera device without any consumption of the auto-focusing actuation power when the camera device is moved from the vertical posture to the horizontal posture. As discussed above, the introduced offset 532 may be determined during assembling of the camera device based on the following variables: (i) an effective BFL of the lens assembly 530; (ii) a displacement of the carrier 515 under gravity at the upright posture of the camera device; and (iii) a springback displacement of the lens assembly 530 and the carrier 515 at the most typical use posture (i.e., horizontal or forward posture) of the camera device; and (iv) a thermal shift of the one or more lenses of the lens assembly 530 at an expected operating temperature of the camera device within an electronic wearable device.

Figure 5C:
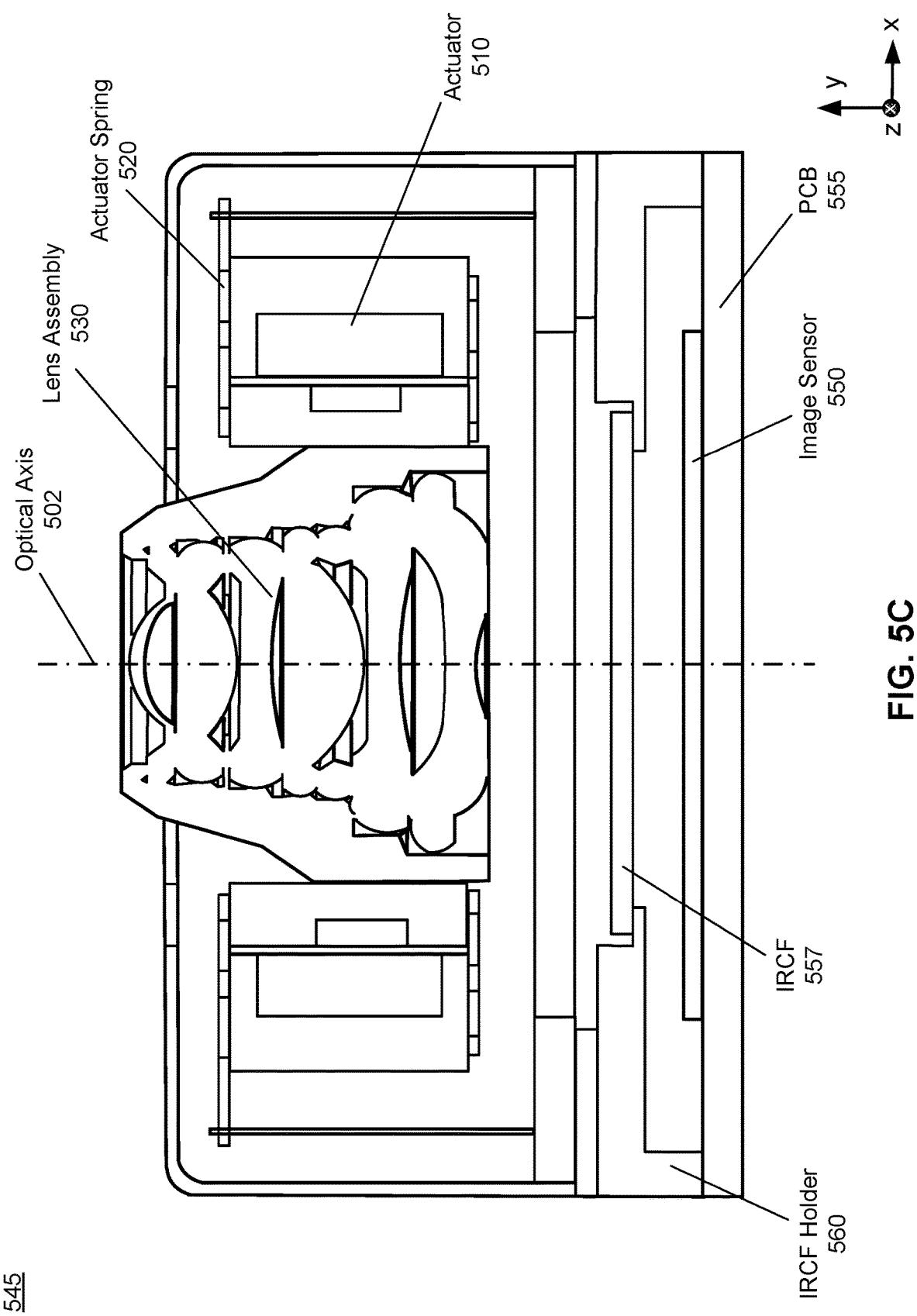
FIG. 5C is a cross section of the camera device having the lens assembly assembled in an upward (vertical) posture and aligned with an image sensor during assembling of the camera device, in accordance with one or more embodiments.
Figure 5D:
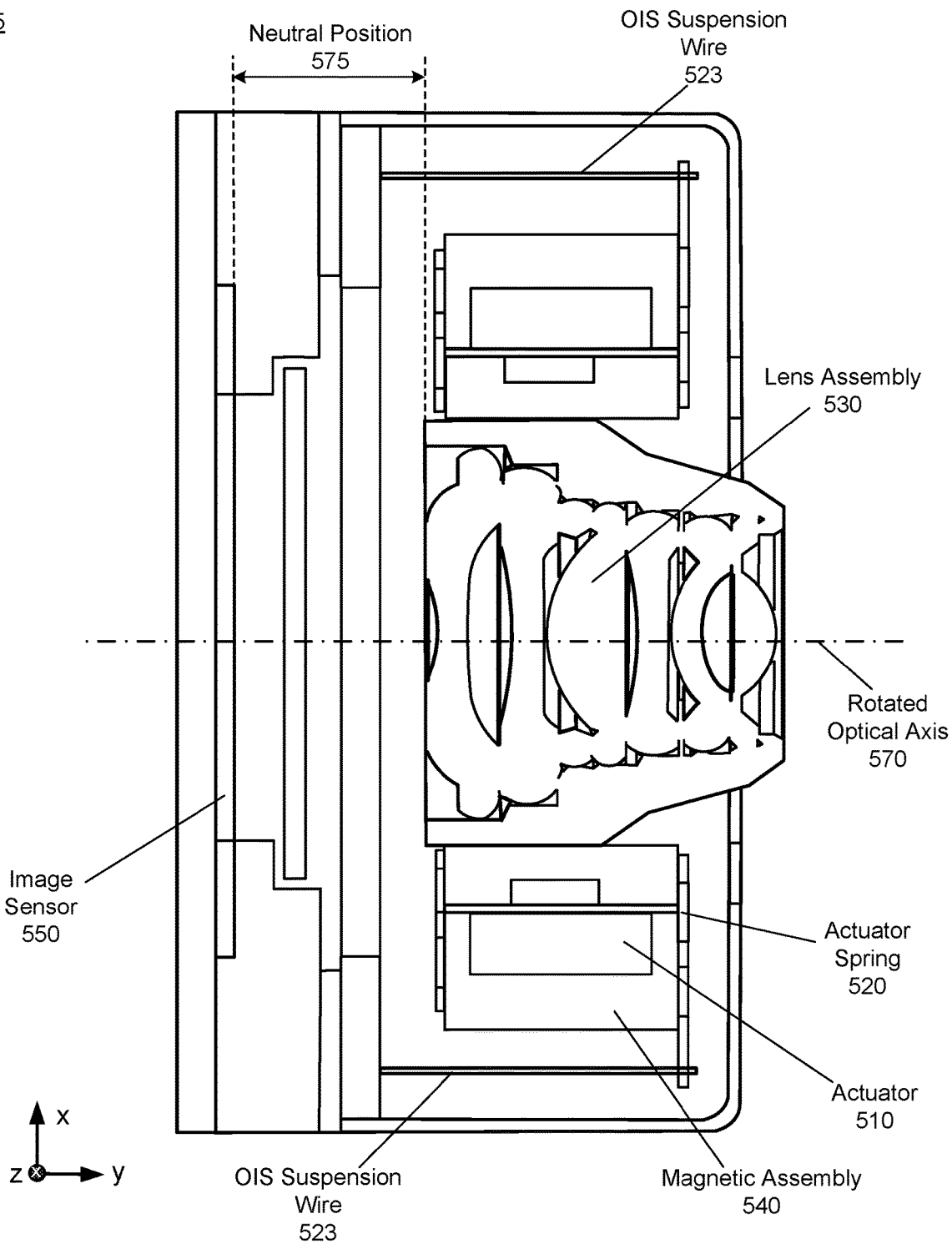
FIG. 5D is a cross section of the camera device with the lens assembly in a forward (horizontal) posture when the camera device is fully assembled, in accordance with one or more embodiments.

FIG. 5C is a cross section 545 of the camera device having the lens assembly 530 assembled in the upward posture and aligned with an image sensor 550 during assembling of the camera device, in accordance with one or more embodiments. The active alignment may be performed during this step of assembling the camera device to align an actuator assembly (i.e., the actuator 510 with the actuator spring 520 and the lens assembly 530 with a PCB sensor assembly (i.e., the image sensor 550 positioned on top of a PCB 555) and an IRCF 557 placed in an IRCF holder 560, e.g., to align various assemblies relative to the optical axis 502. The lens assembly 530 is positioned perpendicular to a plane of the image sensor 550. Additionally, the optical axis 502 of the lens assembly 530 is positioned at a geometrical center of the image sensor 550. The image sensor 550 and the PCB 555 may be embodiments of the image sensor 455 and the PCB 460, respectively. Additionally, the IRCF 557 and the IRCF holder 560 may be embodiments of the IRCF 445 and the IRCF holder 450, respectively.

FIG. 5D is a cross section 565 of the camera device with the lens assembly 530 in a forward (horizontal) posture when the camera device is fully assembled, in accordance with one or more embodiments. The cross section 565 of the camera device corresponds to the most typical use case of the camera device at which the one or more lenses of the lens assembly 530 are also in the horizontal posture. Note that, in the forward (horizontal) posture of the camera device and the lens assembly 530, the lens assembly 530 moves away from the image sensor 550 (along a rotated optical axis 570) by the actuator spring 520. The rotated optical axis 570 corresponds to an optical axis perpendicular to the optical axis 502 in FIGS. 5A-5C (i.e., orthogonal to gravity). The distance 404 in FIG. 4 set during assembling of the camera device may be determined such that, when the camera device is oriented with the rotated optical axis 570 along a defined direction (e.g., along y axis in FIG. 5D), the lens assembly 530 is positioned at a neutral position 575 relative to the image sensor 550 with a level of auto focusing actuation power below a defined threshold level (e.g., the level of auto focusing actuation power is zero-level). In some embodiments, the rotated optical axis 570 is orthogonal to gravity (e.g., gravity being oriented along x axis). The neutral position 575 may correspond to a target position of the lens assembly 530 at which the lens assembly 530 is focused at the hyperfocal distance within a local area surrounding the camera device. For example, the hyperfocal distance may be defined as a distance of approximately 1.7 meter, which corresponds to the most typical use case of the camera device when taking images of the local area. In some embodiments, the target position of the lens assembly 530 corresponds to some other focal position of the lens assembly 530 different than the hyperfocal position. Thus, in some embodiments, by setting the specific distance 304 during assembling of the camera device, no auto-focusing actuation power is consumed by the actuator 510 and the actuator spring 520 when the camera device is moved to the forward (horizontal) posture as the lens assembly 530 has already been positioned at the neutral position 575 (i.e., target position) relative to the image sensor 550 thus achieving a focus of the lens assembly 530 at the hyperfocal distance.

Figure 6:
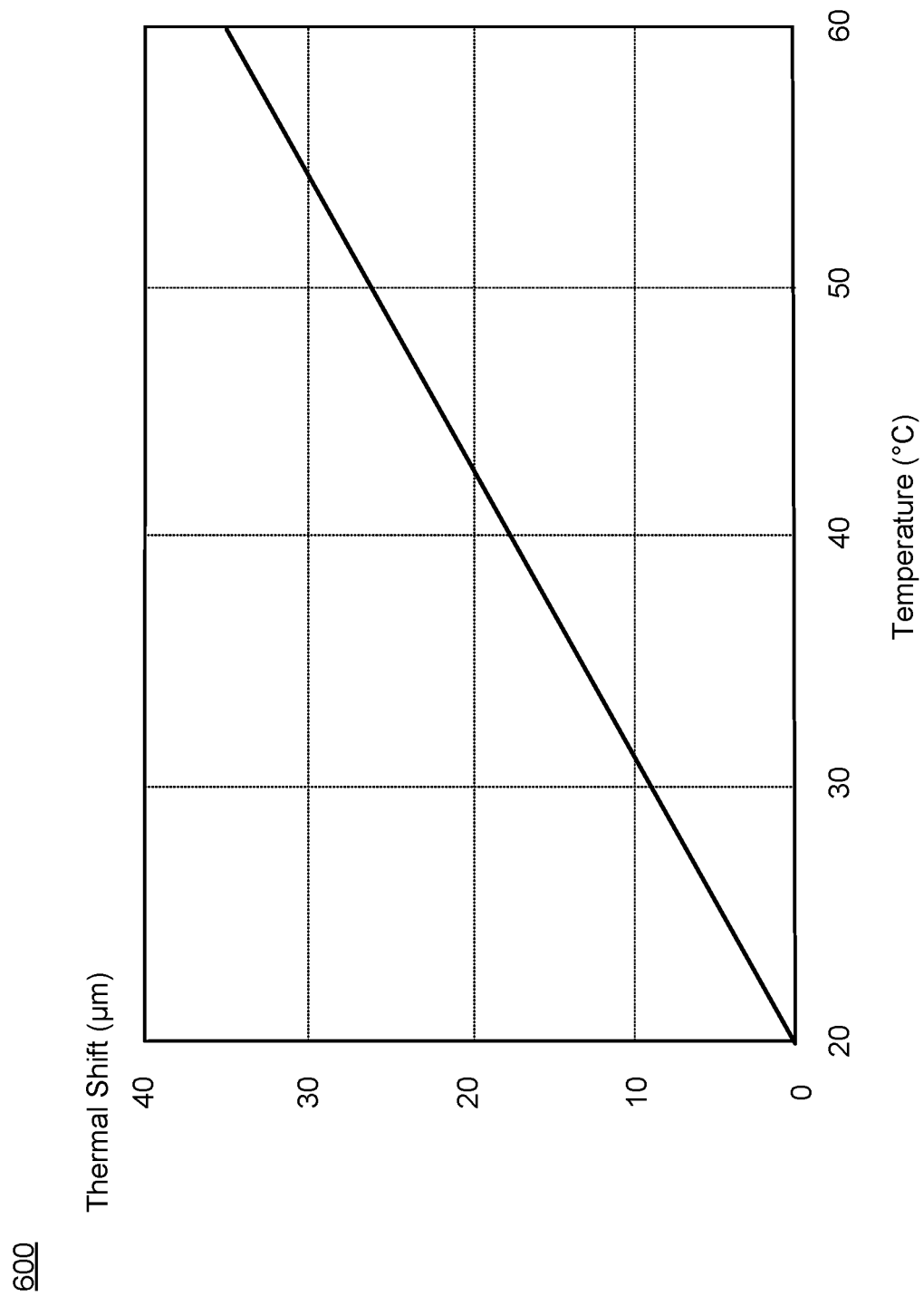
FIG. 6 is a graph illustrating a thermal shift of a lens assembly in a camera device as a function of an operating temperature of the camera device, in accordance with one or more embodiments.

As aforementioned, positioning of a lens assembly during assembling of a camera device (e.g., the camera device 305) may also account for thermal effects of operation of the camera device, such that the target position of the lens assembly is calibrated to occur over a specific temperature range. FIG. 6 is a graph 600 illustrating a thermal shift of a lens assembly (e.g., the lens assembly 410 or the lens assembly 530) in a camera device (e.g., the camera device 305) as a function of an operating temperature of the camera device, in accordance with one or more embodiments. Typically, performance of the lens assembly in the camera device are tested at an ambient (room) temperature, e.g., at a temperature in a defined vicinity of 23° C. However, the camera device can commonly operate at higher temperatures inside an electronic wearable device (e.g., smartwatch), which leads to a thermal shift of the lens assembly. For example, it can be expected that the camera device operates inside the electronic wearable device at temperatures in a defined vicinity of 45° C. (e.g., 45° C.±5° C.). Based on the graph 600, it is therefore expected that the lens assembly moves approximately 20 µm away from an image sensor within the camera device during the typical use case of the camera device for the lens assembly to keep focus onto the image sensor. Therefore, during assembling the camera device, the expected thermal shift (e.g., of approximately 20 µm) may be considered when determining a distance (e.g., the distance 404 in FIG. 4) between the lens assembly and the image sensor. The distance may be increased by the expected thermal shift of the lens assembly relative to the image sensor (e.g., increased by approximately 20 µm).

Additionally, a focal distance of the lens assembly may be modified (e.g., become longer) as shape(s) of one or more lenses in the lens assembly may change due to higher operating temperatures of the camera device. The modified focal distance of the lens assembly at the higher operating temperatures may be considered when determining the distance between the lens assembly and the image sensor during assembling of the camera device. Thus, the distance may be additionally adjusted (e.g., increased) by a specific amount to counter the effect of a modified (e.g., longer) focal distance of the lens assembly 410 at the higher operating temperatures.

FIG. 7 is a flowchart illustrating a process 700 of assembling a camera device to have a specific distance between a lens assembly and an image sensor that reduces (and in some cases minimizes) an auto-focusing actuation power, in accordance with one or more embodiments. Steps of the process 700 of assembling the camera device may be performed by one or more components of a manufacturing system configured for assembling of the camera device. Embodiments may include different and/or additional steps of the process 700, or perform the steps of the process 700 in different orders.

At 705, during assembling of the camera device, the lens assembly is assembled within the camera device to have an optical axis parallel to gravity. In one embodiment, the lens assembly includes a single optical lens. In another embodiments, the lens assembly includes a plurality of optical lenses in an optical series.

At 710, during assembling of the camera device, an offset of the lens assembly along the optical axis relative to a support assembly is determined such that, when the camera device is oriented with a rotated optical axis positioned along a defined direction (e.g., orthogonal to gravity), the lens assembly is positioned at a neutral position relative to the image sensor without actuation applied to the lens assembly. The neutral position may correspond to a target position where the lens assembly is focused at a hyperfocal distance, i.e., the neutral position may be a target distance between the lens assembly and the image sensor. During assembling of the camera device, the support assembly coupled to the lens assembly and the carrier may control the offset of the lens assembly along the optical axis. The support assembly may comprise a lens support and an actuator support.

The offset may be determined based at least in part on an effective BFL of the lens assembly. Alternatively or additionally, the offset may be determined based at least in part on a displacement of a carrier of the lens assembly under gravity at an upward posture of the camera device, and the displacement depends on a weight of the carrier and a stiffness of a spring of an actuator coupled to the lens assembly. Alternatively or additionally, the offset may be determined based at least in part on a displacement between the lens assembly and the carrier at a forward posture of the camera device, and the displacement depends on a weight of the actuator and a spring constant of the actuator. Alternatively or additionally, the offset may be determined based in part on an expected thermal shift of the lens assembly along the rotated optical axis at an operating temperature of the camera device within a defined temperature range.

At 715, during assembling of the camera device, the lens assembly is positioned within the camera device to be in an optical series with an image sensor of the camera device and to have the determined offset along the optical axis.

Figure 8A:
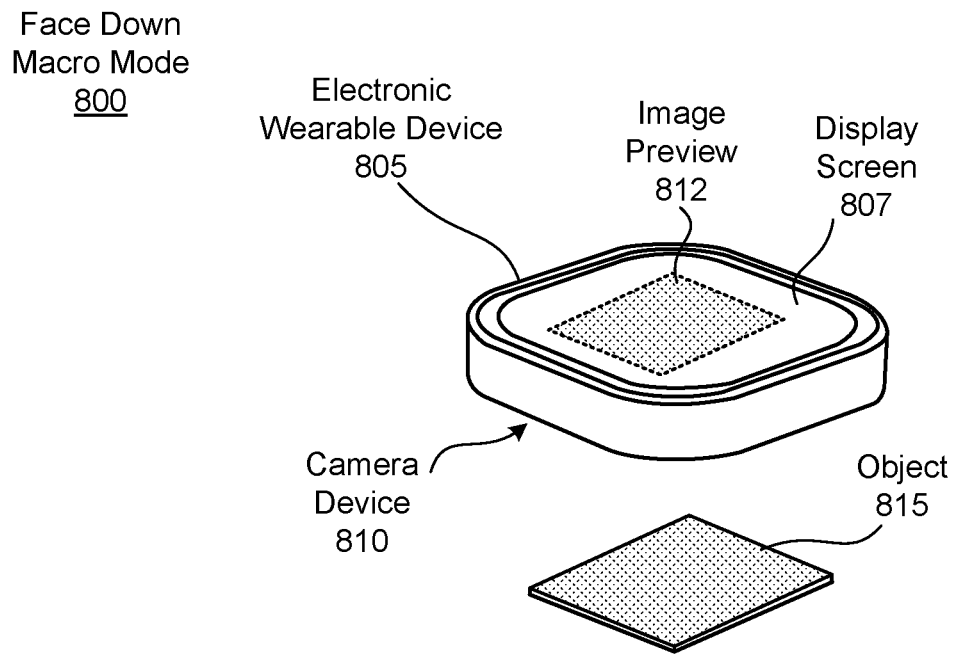
FIG. 8A illustrates an example face down macro mode of an electronic wearable device, in accordance with one or more embodiments.

FIG. 8A illustrates an example face down macro mode 800 of an electronic wearable device 805, in accordance with one or more embodiments. The electronic wearable device 805 may be an embodiment of the watch body 204 or the electronic wearable device 300. The electronic wearable device 805 may include a camera device 810 (not visible in FIG. 8A) oriented in a downward posture (or face down), i.e., toward an object 815 in a local area that is being imaged. A display screen 812 of the electronic wearable device 805 may display an image preview 812 of the object 815 being imaged. One or more images of the object 815 may be captured by the camera device 810 while operating in the macro mode. In one or more embodiments, the camera device 810 can be used for imaging papers (e.g., documents). Alternatively or additionally, the camera device 810 can be used to image other objects as well. The camera device 810 may be an embodiment of the camera device 215 or the camera device 305.

When operating in the face down macro mode 800, the camera device 810 may be poised (i.e., oriented downward with an optical axis substantially parallel to gravity) to take a close-up image of the object 815, while the camera device 810 is focused at the close-up distance from the object 815 (e.g., distance of approximately 0.5 meter or less) with a small amount of actuation or no amount of actuation applied to an actuator of a lens assembly in the camera device 810. Thus, when operating in the face down macro mode 800, the lens assembly of the camera device 810 is at a target position with a small amount of actuation or no amount of actuation applied to the actuator of the lens assembly. In this manner, the lens assembly of the camera device 810 is focused at the close-up distance (i.e., the camera device 810 is placed in the macro mode) with only a small amount of auto-focusing actuation power or no auto-focusing actuation power being consumed. More details about the camera device 810 operating in the face down macro mode 800 are provided below in relation to FIG. 9.

Figure 8B:
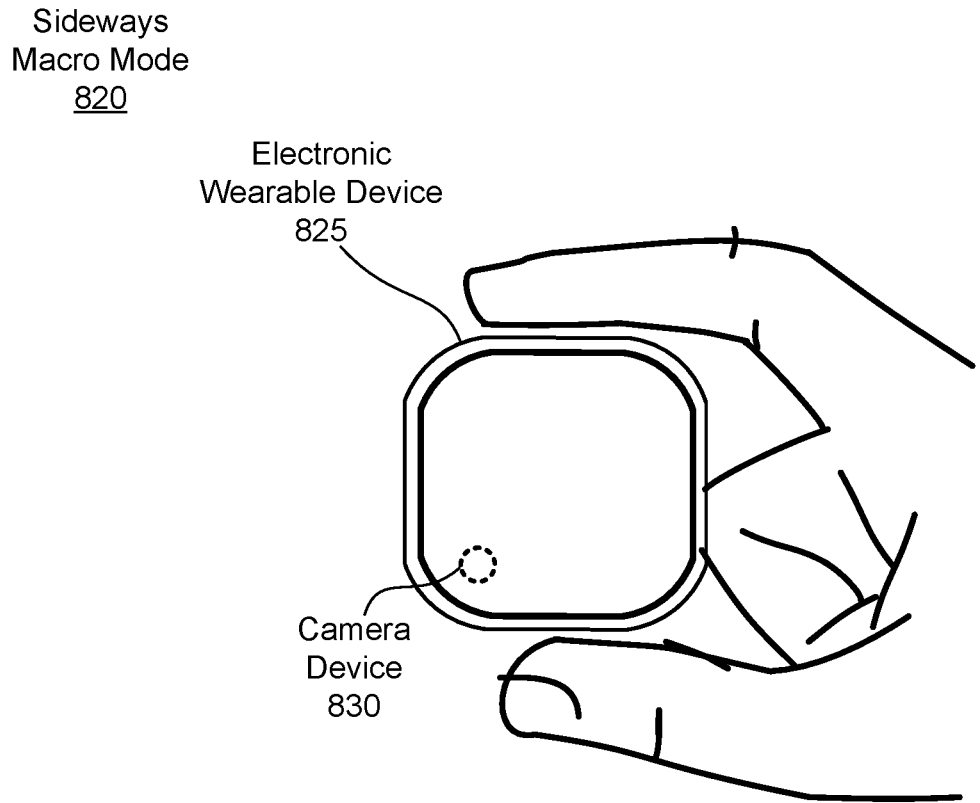
FIG. 8B illustrates an example sideways macro mode of an electronic wearable device, in accordance with one or more embodiments.

FIG. 8B illustrates an example sideways macro mode 820 of an electronic wearable device 825, in accordance with one or more embodiments. The electronic wearable device 825 may be an embodiment of the watch body 204 or the electronic wearable device 300. The electronic wearable device 825 may include a camera device 830 oriented in the forward (e.g., horizontal or sideways) posture, e.g., toward an object in a local area being imaged (not shown in FIG. 8B). The camera device 830 may be an embodiment of the camera device 305. When operating in the sideways macro mode 820, the camera device 830 may be poised (i.e., oriented forward or sideways with an optical axis substantially orthogonal to gravity) to take a close-up image of the local area, while the camera device 830 is focused at the close-up distance from the local area (e.g., distance of approximately 0.5 meter or less) with a non-zero amount of actuation (e.g., less than a threshold amount) applied to an actuator of a lens assembly in the camera device 830. Thus, when operating in the sideways macro mode 820, the lens assembly of the camera device 830 is at the target position with the non-zero amount of actuation (e.g., less than the threshold amount) applied to the actuator of the lens assembly. The amount of actuation applied to the camera device 830 in the sideways macro mode 820 may be larger than the amount of actuation applied to the camera device 810 in the face down macro mode 800.

Referring back to FIG. 5D, in some embodiments, the camera device in FIG. 5D operates in the sideways macro mode 820. The camera device in FIG. 5D may be an embodiment of the camera device 830. In the sideways macro mode 820, the lens assembly 530 may be at the neural position 575 relative to the image sensor 550 with a non-zero amount of actuation (e.g., less than a threshold amount) applied to the actuator 510. At the neural position 575, the lens assembly 530 is focused at the close-up distance (e.g., distance of approximately 0.5 meter or less) from an object in local area being captured. The threshold amount of actuation (i.e., maximum allowable actuation power) may be a function of an overall camera system design including a power budget allocated to the camera device. In one or more embodiments, the threshold amount of actuation is dynamically adjusted. Alternatively or additionally, the close-up distance is dynamically adjusted based on a power level of a battery of the camera device (not shown in FIG. 5D).

As aforementioned, the lens assembly 530 in the camera device of FIG. 5D may be positioned at the neutral position 575 relative to the image sensor 550 with the level of auto focusing actuation power below the defined threshold level (e.g., the level of auto focusing actuation power is zero-level) such that the lens assembly 530 is focused at the hyperfocal distance. When operating in the macro mode (e.g., the face down macro mode or the sideways macro mode), the lens assembly 530 may be positioned at a "macro mode position" relative to the image sensor 550 (not shown in FIG. 5D) different from the neutral position 575 so that the lens assembly 530 may be focused at the close-up distance from the local area by applying to the actuator 510 an auto focusing actuation power (i.e., auto focusing actuation force) below a threshold level.

The level of auto focusing actuation power required to focus the lens assembly 530 at the close-up distance may be greater than the level of auto focusing actuation power required to focus the lens assembly 530 at the hyperfocal distance. However, a reduced level of auto-focusing actuation force (e.g., below a threshold level allowing the camera device to stay within a power consumption budget) may still be applied to the actuator 530 to focus the lens assembly 530 at the close-up distance when the camera device operates in the macro mode (e.g., the face down macro mode or the sideways macro mode). The reduced level of auto-focusing actuation force required for focusing the lens assembly 530 at the close-up distance in the macro mode may be achieved by designing the actuator spring 520 to have a specific stiffness. Additionally or alternatively, the reduced level of auto-focusing actuation force required for focusing the lens assembly 530 at the close-up distance in the macro mode may be achieved by designing the lens assembly 530 (e.g., one or more lenses in the lens assembly 530) to have a specific mass. Additionally or alternatively, the lens assembly 530 can be focused at the close-up distance in the macro mode while meeting the power consumption budget of the camera device based on a design of an OIS assembly of the camera device to achieve a specific amount of shift (i.e., optical stroke) of the lens assembly 530 and/or the image sensor 550 (e.g., along at least one dimension). The OIS assembly may include one or more OIS suspension wires 523, the actuator 530, and one or more magnets included in a magnetic assembly 540. The OIS assembly of the camera device in FIG. 5D may include more or fewer components.

Figure 9:
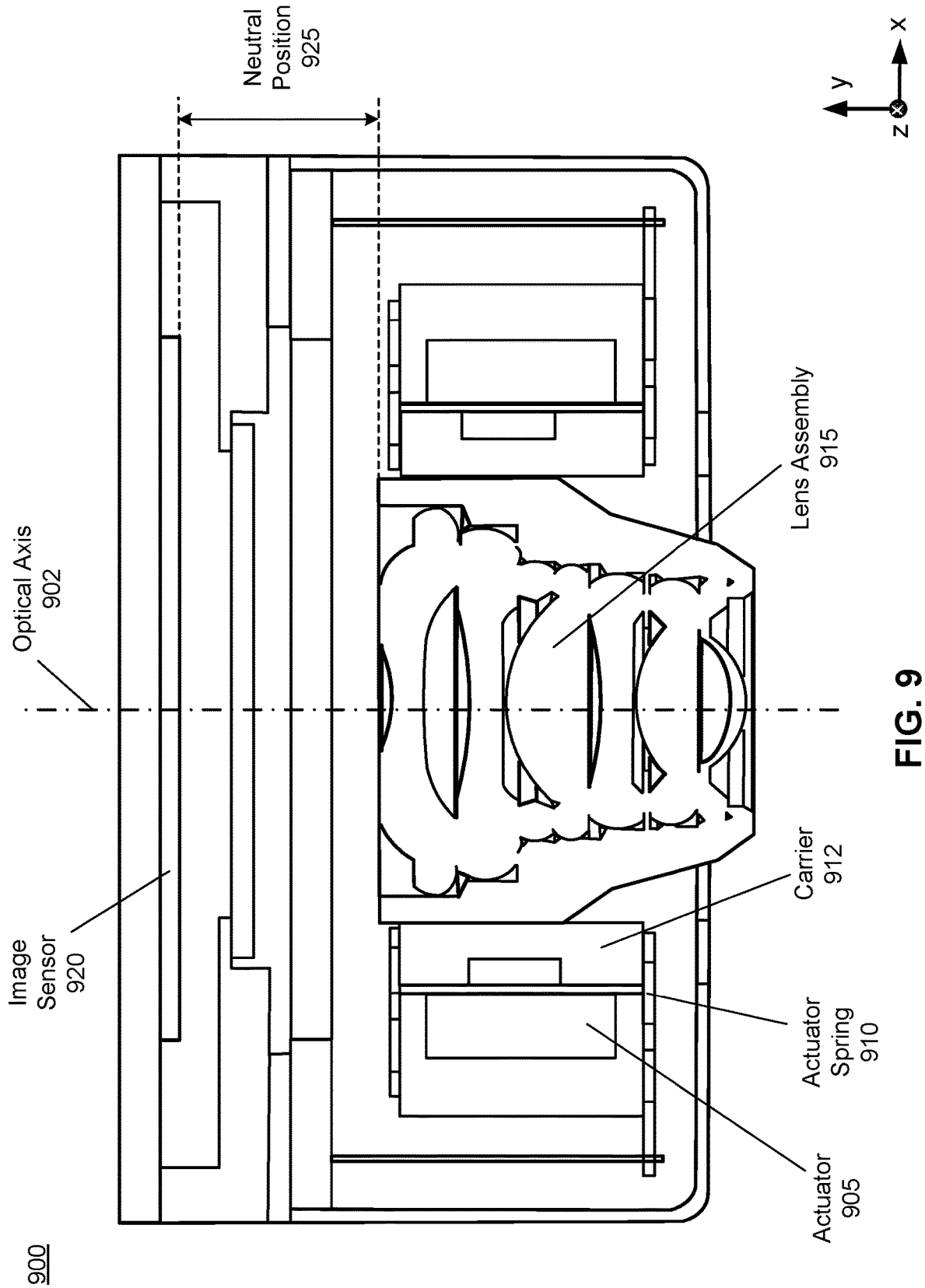
FIG. 9 is a cross section of a camera device with a lens assembly in a downward (face down) posture operating in a macro mode, in accordance with one or more embodiments.

FIG. 9 is a cross section of a camera device 900 in a downward (face down) posture operating in a macro mode, in accordance with one or more embodiments. The camera device 900 may include an actuator 905, an actuator spring 910, a carrier 912, a lens assembly 915, and an image sensor 920. The camera device 900 may include additional or fewer components than what is illustrated in FIG. 9. The camera device 900 may be an embodiment of the camera device 305. When operating in the macro mode, the camera device 900 may be poised to take a close-up image of a local area, while the lens assembly 915 is focused at the close-up distance from the local area with a small amount of actuation or no actuation applied to the actuator 905. The cross section of the camera device 900 may correspond to the most typical use case of the camera device 900 at which one or more lenses of the lens assembly 915 are also in the downward (face down) posture. An optical axis 902 of the lens assembly 915 may be substantially parallel to gravity. The small amount of actuation may be a function of an overall camera system design including a power budget allocated to the camera device 900. In one or more embodiments, the small amount of actuation is dynamically adjusted. Alternatively or additionally, the close-up distance of the camera device 900 in the downward posture is dynamically adjusted based on a power level of a battery of the camera device 900 (not shown in FIG. 9).

During assembling of the camera device 900, an offset of the lens assembly 915 along the optical axis 902 may be determined such that, when the camera device 900 is oriented downward, the lens assembly 915 is positioned at a neutral position 925 relative to the image sensor 920 with a level of auto focusing actuation power below a defined threshold level (e.g., the level of auto focusing actuation power is zero-level). The neutral position 925 may correspond to a target position of the lens assembly 915 at which the lens assembly 915 is focused at the close-up distance from the local area. For example, the close-up distance may be defined as a distance of approximately 0.5 meter or less, which corresponds to the most typical use case of the camera device 900 when taking close-up images of the local area (i.e., when the camera device 900 operates in the macro mode).

In some embodiments, the offset of the lens assembly 915 along the optical axis 902 is determined during assembling of the camera device 900 based at least in part on a displacement of the carrier 912 under gravity at the downward posture of the camera device 900. The displacement may depend at least in part on, e.g., a weight of the carrier 912 and a stiffness of the actuator spring 910. During assembling of the camera device 900, a support assembly (not shown in FIG. 9) with a lens support and an actuator support may control the offset of the lens assembly 915 along the optical axis 902.

In some embodiments, for the camera device 900 to stay within a desired power consumption budget, a macro object distance (MOD) is adjusted based on an orientation (i.e., posture) of the camera device 900. The MOD may correspond to a close-up distance to which the lens assembly 915 is focused when the camera device 900 operates in the macro mode. When the camera device 900 is at the downward posture while operating in the macro mode, the lens assembly 915 of the camera device 900 may be at the neutral position 925 and focused at a first MOD. When the camera device 900 is oriented sideways (i.e., in the forward posture) while operating in the macro mode, a specific non-zero auto focusing actuation power may be applied to the actuator 905 to focus the lens assembly 915 at a second MOD that is further than the first MOD. By focusing the lens assembly 915 at the further second MOD when the camera device 900 is oriented sideways in the macro mode, the applied auto focusing actuation power is still below a threshold level thus allowing the camera device 900 to stay within the desired power consumption budget when operating in the sideways macro mode.

FIG. 10 is a flowchart illustrating a process of assembling a camera device to have a specific distance between a lens assembly and an image sensor at a downward (face down) posture when operating in a macro mode, in accordance with one or more embodiments. Steps of the process 1000 of assembling the camera device may be performed by one or more components of a manufacturing system configured for assembling of the camera device. Embodiments may include different and/or additional steps of the process 1000, or perform the steps of the process 1000 in different orders.

At 1005, during assembling of the camera device, the lens assembly is assembled within the camera device to have an optical axis substantially parallel to gravity. In one embodiment, the lens assembly includes a single optical lens. In another embodiments, the lens assembly includes a plurality of optical lenses in an optical series.

At 1010, during assembling of the camera device, an offset of the lens assembly along the optical axis is determined such that, when the camera device is in a macro mode, the lens assembly is positioned at a neutral position relative to an image sensor of the camera device without actuation applied to the lens assembly.

The offset may be determined during assembling of the camera device based at least in part on a displacement of a carrier of the lens assembly under gravity at a downward posture of the camera device. The displacement may depend on a weight of the carrier and a stiffness of a spring of an actuator coupled to the lens assembly. During assembling of the camera device, a support assembly coupled to the lens assembly may control the offset of the lens assembly along the optical axis. The support assembly may comprise a lens support and an actuator support.

In one embodiment, the camera device is oriented downward in the macro mode (e.g., as shown in FIG. 8A and FIG. 9). In another embodiment, the camera device is oriented sideways in the macro mode (e.g., at forward or horizontal position, as shown in FIG. 5D and FIG. 8B). The neutral position may correspond to a target position where the lens assembly is focused at a close-up distance less then a threshold distance (e.g., approximately 0.5 meter or less). The neutral position may be a target distance between the lens assembly and the image sensor.

The lens assembly may be positioned at the neutral position without actuation applied to an actuator of the lens assembly when the camera device is oriented downward in the macro mode having the optical axis substantially parallel to gravity. The lens assembly may be positioned at the neutral position with a defined level of actuation (e.g., less than a threshold amount) applied to the actuator of the lens assembly when the camera device is oriented sideways in the macro mode having the optical axis substantially orthogonal to gravity. The lens assembly may be focused at a first distance when the camera device is oriented sideways in the macro mode having the optical axis substantially orthogonal to gravity, and the lens assembly may be focused at a second distance closer than the first distance when the camera device is oriented downward in the macro mode having the optical axis substantially parallel to gravity.

At 1015, during assembling of the camera device, the lens assembly is positioned within the camera device to be in an optical series with the image sensor and to have the determined offset along the optical axis.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A camera device comprising:
   an image sensor; and
   a lens assembly in an optical series with the image sensor,
      wherein during manufacturing of the camera device,
      the lens assembly is assembled within the camera device to have an optical axis substantially parallel to gravity and positioned to have an offset along the optical axis,
      the offset is determined such that, when the camera device is in a macro mode, the lens assembly is positioned at a neutral position relative to the image sensor without actuation applied to the lens assembly;
   wherein the lens assembly is focused at a first distance when the camera device is oriented sideways in the macro mode having the optical axis substantially orthogonal to gravity and the lens assembly is focused at a second distance closer than the first distance when the camera device is oriented downward in the macro mode having the optical axis substantially parallel to gravity.

2. The camera device of claim 1, wherein the neutral position corresponds to a target distance between the lens assembly and the image sensor.

3. The camera device of claim 1, wherein the neutral position corresponds to a target position in the macro mode where the lens assembly is focused at a distance less than a threshold distance.

4. The camera device of claim 1, wherein the lens assembly is positioned at the neutral position without actuation applied to the lens assembly when the camera device is oriented downward in the macro mode having the optical axis substantially parallel to gravity.

5. The camera device of claim 1, wherein the lens assembly is positioned at the neutral position with a level of actuation applied to the lens assembly of less than a threshold level, when the camera device is oriented sideways in the macro mode having the optical axis substantially orthogonal to gravity.

6. The camera device of claim 1, wherein, during assembling of the camera device, a support assembly coupled to the lens assembly controls the offset along the optical axis, the support assembly comprising a lens support and an actuator support.

7. The camera device of claim 1, wherein the offset is determined during assembling of the camera device based at least in part on a displacement of a carrier of the lens assembly under gravity at a downward posture of the camera device.

8. The camera device of claim 7, wherein the displacement depends on a weight of the carrier and a stiffness of a spring of an actuator coupled to the lens assembly.

9. The camera device of claim 1, wherein the camera device is part of a smartwatch.

10. A wristband system comprising:
    a watch band;
    a watch body that is removably coupled to the watch band; and
    a camera device located on the watch body, the camera device including an image sensor and a lens assembly in an optical series with the image sensor, wherein during manufacturing of the camera device, the lens assembly is assembled within the camera device to have an optical axis substantially parallel to gravity and positioned to have an offset along the optical axis, and the offset is determined such that, when the camera device is in a macro mode, the lens assembly is positioned at a neutral position relative to the image sensor without actuation applied to the lens assembly to reach the neutral position, wherein the lens assembly is focused at a first distance when the camera device is oriented sideways in the macro mode having the optical axis substantially orthogonal to gravity and the lens assembly is focused at a second distance closer than the first distance when the camera device is oriented downward in the macro mode having the optical axis substantially parallel to gravity.

11. The wristband system of claim 10, wherein the neutral position corresponds to a target position in the macro mode where the lens assembly is focused at a distance less than a threshold distance.

12. The wristband system of claim 10, wherein the lens assembly is positioned at the neutral position with a level of actuation applied to the lens assembly of less than a threshold level, when the camera device is oriented sideways in the macro mode having the optical axis substantially orthogonal to gravity.

13. A method of manufacturing a camera device, the method comprising:

assembling a lens assembly within the camera device to have an optical axis substantially parallel to gravity;

determining an offset of the lens assembly along the optical axis such that, when the camera device is in a forward posture, the lens assembly is automatically positioned in its hyperfocal position without actuation applied to the lens assembly to reach the hyperfocal position; and positioning the lens assembly within the camera device to be in an optical series with the image sensor and to have the determined offset along the optical axis, wherein the lens assembly is focused at a first distance when the camera device is oriented sideways in the macro mode having the optical axis substantially orthogonal to gravity and the lens assembly is focused at a second distance closer than the first distance when the camera device is oriented downward in the macro mode having the optical axis substantially parallel to gravity.

14. The method of claim 13, further comprising:

determining the offset during assembling of the camera device based at least in part on a height of a lens support and actuator support to achieve an automatic hyperfocal position.

* * * * *